(12) United States Patent
Chainer et al.

(10) Patent No.: US 6,476,989 B1
(45) Date of Patent: Nov. 5, 2002

(54) RADIAL SELF-PROPAGATION PATTERN GENERATION FOR DISK FILE SERVOWRITING

(75) Inventors: Timothy Chainer, Putnam Valley, NY (US); Mark Delorman Schultz, Ossining, NY (US); Bucknell Chapman Webb, Ossining, NY (US); Edward John Yarmchuk, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/304,233

(22) Filed: May 3, 1999

Related U.S. Application Data

(63) Continuation-in-part of application No. 08/677,052, filed on Jul. 9, 1996, now abandoned.

(51) Int. Cl.[7] .............................................. G11B 27/36
(52) U.S. Cl. ........................ 360/31; 360/75; 360/53; 360/60; 360/77.08; 360/73.03
(58) Field of Search ............................ 360/75, 53, 31, 360/69, 60, 51, 77.08, 67, 68, 46, 73.03

(56) References Cited

U.S. PATENT DOCUMENTS

| 5,448,429 A | * | 9/1995 | Cribbs et al. .................. 360/75 |
| 5,541,784 A | * | 7/1996 | Cribbs et al. .................. 360/75 |
| 5,600,500 A | * | 2/1997 | Madsen et al. ................ 360/46 |

FOREIGN PATENT DOCUMENTS

JP          01-130370          5/1989

* cited by examiner

Primary Examiner—Alan T. Faber
(74) Attorney, Agent, or Firm—Randall J. Bluestone; Dunzler & Associates

(57) ABSTRACT

An improved servowriting system and method whereby errors introduced into the written servo information are reduced or eliminated for greater servowriting accuracy. Accuracy is enhanced by one or more of the following improvements: 1) optimizing write current and write frequency to minimize write width modulation; 2) optimizing the RPM of the storage medium to minimize random mechanical vibration; and 3) providing a clip level check to eliminate the introduction of large errors in product servopattern. The proposed improvements provide substantial rejection of, for example, mechanical and magnetic disturbances, ensuring a robust servowriting process.

47 Claims, 13 Drawing Sheets

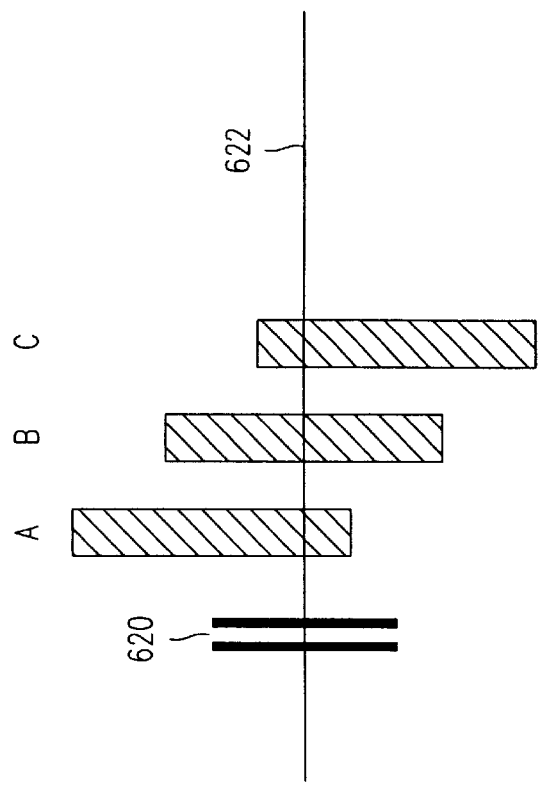
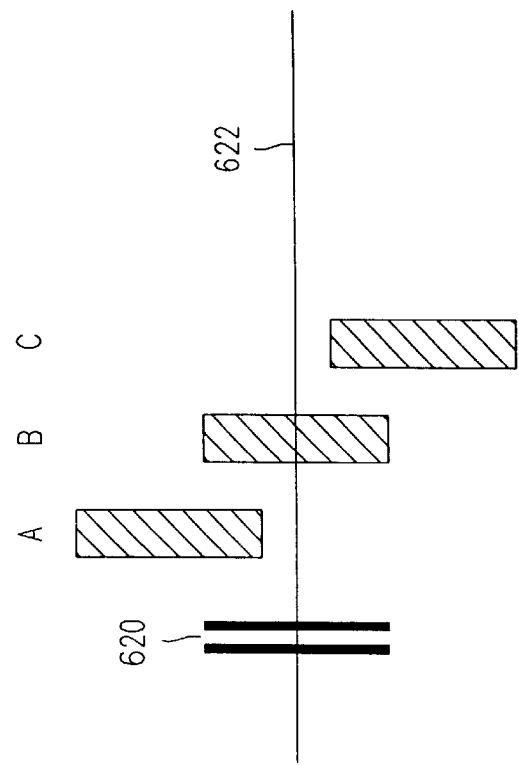

RADIAL SELF-PROPAGATION PATTERN GENERATION FOR DISK FILE SERVOWRITING

This application is a continuation-in-part of application Ser. No. 08/677,052, filed Jul. 9, 1996 now abandoned. This application is related to U.S. Pat. No. 5,612,833, of T. Chainer et al., filed on Dec. 2, 1994, entitled "Radial Self-Propagation Pattern Generation for Disk File Servowriting." It is also related to U.S. patent application Ser. No. 08/028,044, filed on Mar. 8, 1993, entitled "A Method and System for Writing a Servo-Pattern on a Storage Medium" now abandoned, from which four divisional applications stem, one having issued on Jan. 16, 1996 as U.S. Pat. No. 5,485,322, all commonly assigned herewith.

BACKGROUND OF THE INVENTION

FIELD OF THE INVENTION

The invention relates generally to information storage devices. More particularly it relates to an improved servowriting system and method for implementation in a storage device wherein errors introduced into the written position or servo information are reduced or eliminated.

Increased levels of storage capacity in storage devices such as removable disk disk-drives, hard disk drives, and tape drives are a direct result of the higher track densities possible with voice-coil and other types of servo positioners as well as the ability to read and write narrower tracks by using, for example, magnetoresistive (MR) head technology. Head positioning is accurately controlled using positional information stored on the disk itself, as in dedicated and embedded servo architectures.

Conventional servo-patterns in an "embedded servo" disk drive architecture typically comprise short bursts of a constant frequency signal, very precisely offset to either side of a data track's center line. The bursts precede data regions of the track and are used to align a head with respect to the track center. Staying on track center is required during both reading and writing for accurate data storage and retrieval. Since there can be, for example, sixty or more data regions per track, that same number of servo data areas are preferably distributed around a track to provide means for a head to follow the track's center line as the disk rotates, even when the track is out of round, e.g., as a result of spindle wobble, disk slip and/or thermal expansion. As technology advances to provide smaller disk drives and increased track densities, the accurate placement of servo data must also increase proportionately.

Servo-data are conventionally written by costly dedicated servowriting equipment external to the disk drive equipped with large granite blocks for supporting the drive and quieting external vibrational effects. An auxiliary clock head is inserted onto the surface of the recording disk to write a reference timing pattern, and an external head/arm assembly is used to precisely position the transducer. The positioner includes a very accurate lead screw and a laser displacement measurement device for positional feedback. Servotracks are written on the media of a head disk assembly (HDA) with a specialized servowriter instrument. Laser positioning feedback is used in such instruments to read the actual physical position of a recording head used to write the servotracks.

A disadvantage of servo writers such as those described is that they require a clean room environment, as the disk and heads will be exposed to the environment to allow the access of the external head and actuator. Additionally, it is becoming more and more difficult for such servowriters to invade the internal environment of an HDA for servowriting because the HDAs themselves are exceedingly small and depend on their covers and castings to be in place for proper operation. Some HDAs, for instance, are the size and thickness of a plastic credit card.

In view of these challenges, a disk drive able to perform self-servo writing would be tremendously advantageous. However, this approach presents a new set of challenges. Specifically, self-servowriting systems are more prone to mechanical disturbances. Moreover, because of the interdependency of propagation tracks in self-servowriting, track shape errors introduced by mechanical disturbances and other factors may be amplified from one track to the next when writing the propagation tracks.

Servopatterns consist of bursts of transitions located at intervals around the disk surface. In self-propagation, the radial position signal that is used to servo-control the actuator is derived from measurements of the readback amplitude of patterns that were written during a previous step of the servowrite process. That is, the burst edges of a written track comprise a set of points defining a track shape that the servo controller will attempt to follow when writing the next track. Thus, errors in the transducer position during burst writing appear as distortions away from a desired circular track shape. The servo controller causes the actuator to follow the resulting non-circular trajectory in a next burst writing step, so that the new bursts are written at locations reflecting (via the closed-loop response of the servo loop) the errors present in the preceding step, as well as in the present step. Consequently, each step in the process carries a "memory" of all preceding track shape errors. This "memory" depends on the particular closed-loop response of the servo loop.

A primary requirement in disk files is that each track be separated at all points by some minimum spacing from adjacent tracks. This requirement ensures that neighboring track information is not detected on readback, resulting in data read errors, and more importantly, that adjacent track data will never be excessively overlapped during writing, potentially resulting in permanent loss of user data. In other words, the detailed shape of each track relative to its neighbors must be considered, not just the track to track distance averaged around the whole disk. Radial separation between adjacent track locations is determined by the product servopattern written on each track and at each angular location around the disk, since the servo-control of the actuator during actual file operation is capable of following distortions from perfect circularity and will produce mis-shapen data tracks.

A consideration in setting the minimum allowable spacing for self propagation schemes is the existence of random fluctuations about the desired track location resulting from mechanical disturbances during actual file operation. Effects that result in track shape errors in a self-servowriting system include, for example, include random mechanical motion and modulation in the width of the written track that results, e.g., from variations in the properties of the recording medium or the flying height of the transducer. Random mechanical motion can be lowered using a high gain servo loop, but this leads to error compounding. Random magnetic modulation variations reduce the pattern accuracy of all servowriters, but error compounding in self-propagation can further amplify its effects. Uncontrolled growth of such errors can lead to excessive track non-circularity, and in some cases, may even lead to exponential growth of errors, exceeding all error margins and causing the self-propagation process to fail.

One of the largest sources of mechanical disturbance in a disk drive is the turbulent wind generated by the spinning disks blowing against the actuator. The total amount of fluctuation, referred to as track misregistration or TMR, defines a relevant scale for judging the required accuracy of servopattern placement. If servopattern placement errors are roughly equal to or greater than the TMR, then a substantial fraction of the track spacing margin will be required as compensation and the total disk file data capacity will accordingly be reduced. In this instance, reduction in servopattern errors may substantially increase file capacity.

Consequently, self-servowriting systems must provide a means for accurately writing servopatterns while controlling the propagation of track shape errors.

One self-servo writing method is disclosed in U.S. Pat. No. 4,414,589 to Oliver et al., which teaches optimization of track spacing. Head positioning is achieved in the following manner. First, one of the moving read/write heads is positioned at a first stop limit in the range of movement of the positioning means. The head is used to write a first reference track. A predetermined percentage of amplitude reduction, X%, is selected that empirically corresponds to the desired average track density. The moving head reads the first reference track and is displaced away from the first stop limit until the amplitude of the signal from the first reference track is reduced to X% of its original amplitude. A second reference track is then written by the head at the new location, read, and the head is again displaced in the same direction until the amplitude of signal from the second reference track is reduced to X% of its original value. The process is continued until the disc is filled with reference tracks. The average track density is checked to insure that it is within a predetermined acceptable range of the desired average track density. If the average track density is too high or too low, the disk is erased, the X% value is appropriately lowered or increased, and the process is repeated. If the average track density is within the predetermined acceptable range, the desired reduction rate X% for a given average track density has been determined and the servo writer may then proceed to the servo writing steps.

U.S. Pat. No. 4,912,576 to Janz and U.S. Pat. No. 5,448,429 to Cribbs et al. describe methods for writing a servopattern with a disk drive's own pair of transducers. Three types of servo-patterns are used to generate three-phase signals that provide a difference signal having a slope directly proportional to velocity. Janz observes that the signal level from a transducer is a measure of its alignment with a particular pattern recorded on the disk. For example, if the flux gap sweeps only forty percent of a pattern, then the read voltage will be forty percent of the voltage maximum obtainable when the transducer is aligned dead-center with the pattern. Janz uses this phenomenon to position the heads by straddling two of three offset and staggered patterns along a centerline path intended for data tracks. In a preferred process, Janz describes a dedicated servo architecture wherein one side of a disk is reserved for servo and the other side for data. The disk drive includes two transducers on opposite surfaces that share a common actuator. To format an erased disk for data initialization, a first phase servo is written on the servo side at an outer edge. The transducers are then moved-in radially one half of a track, as indicated by the first phase servotrack amplitude, and a first data-track is recorded on the data side. The transducers are again moved radially inward one half of a track, this time as indicated by the first data-track amplitude, and a second phase servotrack is recorded on the servo side. This sequence is repeated until both surfaces are entirely written. If too few or too many tracks are written, the disk is reformatted with a slight adjustment to the step width, as determined by the track count. Once the disk drive has been formatted with an entire compliment of properly spaced servotracks, the data-tracks are erased in preparation for receiving user data. Unfortunately, the method described by Janz requires a dedicated disk surface for servotracks and two heads working in tandem. Moreover, transducer flying height variations, spindle runout, and media inconsistencies can corrupt radial position determinations that rely on a simple reading of off-track read signal amplitudes. Prior art methods do not address these issues and are therefore inadequate for high performance disk drives applications.

Cribbs et al. teaches a hard disk drive system with self-servowriting capability comprising a rotating recording disk, transducer in communication with the disk surface, servo-actuator means for radially sweeping the transducer over the surface, a variable gain read amplifier (VGA) coupled to the transducer, an analog to digital converter (ADC) coupled to the VGA, an erase frequency oscillator coupled to the transducer for DC erasing of the disk surface, a memory for storing digital outputs appearing at the ADC, and a controller for signaling the servo-actuator to move to such radial positions that result in transducer read amplitudes that are a percentage of previous read amplitudes represent in the digital memory.

The prior art fails to solve the problem of random mechanical motion resulting in reduced disk file capacity, or to address the relationship between random mechanical motion and error compounding. It also fails to address the relationship between magnetic write width modulation and error compounding, or even error compounding viewed independently.

Accordingly, what is needed is a self-servowriting system and method which overcomes the preceding problems to provide a highly accurate and cost effective positioning system applicable to not only hard disk drives, but also to other storage devices wherein head positioning is achieved using similar principles.

SUMMARY OF THE INVENTION

It is the principal object of this invention to provide an improved method and system by which errors introduced into position or servo information can be kept to a minimum in the servowriting process.

Accordingly, the present invention is a servowriting method and system having one or more of the following improved features: 1) optimized transducer write current and frequency for minimized write width modulation; 2) optimized servowriting RPM for minimized random mechanical vibration; and 3) clip level checking to eliminate the introduction of large errors in product servopattern.

DESCRIPTION OF THE DRAWINGS

For a fuller understanding of the nature and advantages of the present invention, as well as the preferred mode of use, reference should be made to the following detailed description read in conjunction with the accompanying drawings.

FIGS. 6A and 6B are circumferential sections of a track with different write width modulation;

DETAILED DESCRIPTION OF THE PREFERRED EMBODIMENTS

Disclosed herein are improvements to a self-servowriting apparatus and method such as that described in U.S. Pat. Nos. 5,612,833 and 5,659,436. Accordingly, the underlying inventions of those applications will be described to set the stage for the proposed modifications.

I. Self-Servowriting Disk Drives

Figure 1:
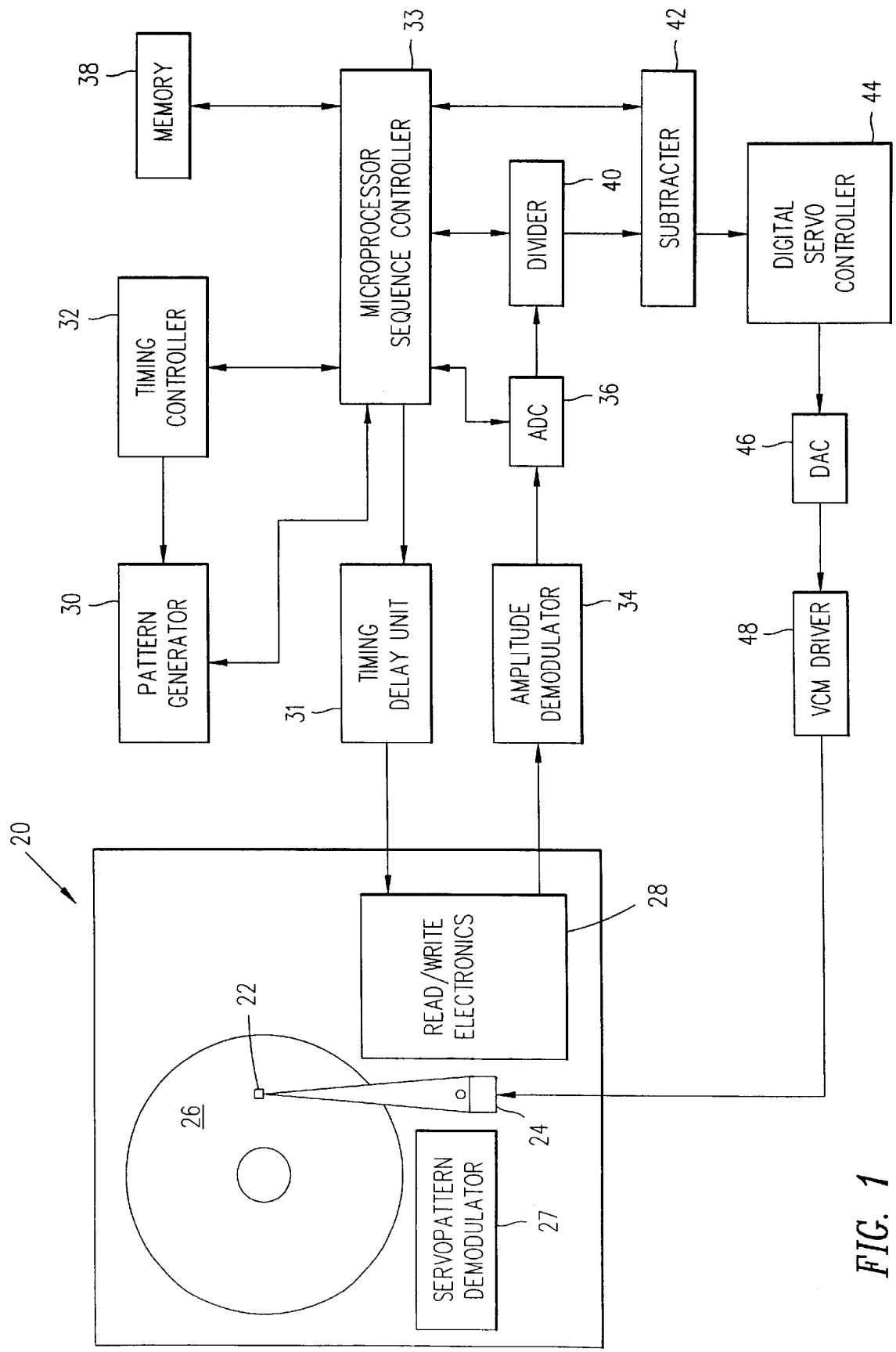
FIG. 1 is a block diagram of a self-servowriting system suitable for practicing the present invention.

FIG. 1 provides the major components of a self-propagating disk drive servowriting system for practicing the present invention. A disk drive 20 comprises a recording transducer 22, voice coil actuator 24, recording medium 26, servopattern demodulator 27, and read/write control electronics 28. The normal operating functions of these elements are well understood in the disk drive industry. The disk drive 20 is connected to a time delay unit 31 in series with a pattern generator 30, which is clocked by a timing controller 32. The timing controller 32, under the direction of a microprocessor sequence controller 33, allows bursts of magnetic transitions to be recorded at precisely controlled times. For the purposes of radial self-propagation burst writing and detection, the timing controller comprises, for example, the AM9513A system timing controller manufactured by Advanced Micro Devices Corporation of Sunnyvale, Calif., which is simply synchronized to a once per revolution index timing mark. It shall be understood, however, that the writing of actual product servopatterns requires much tighter timing control, particularly when writing the servo identification fields and whenever writing phase encoded servo patterns. Methods for achieving such precise timing control using the internal disk file recording transducer, in a manner consistent with self-propagation are described in U.S. Pat. No. 5,485,322 and are expressly incorporated herein by reference.

A readback signal from the read/write electronics 28 is provided to an amplitude demodulator circuit 34, and its amplitude is converted to a digital value by an analog-to-digital converter (ADC) 36 at times determined by timing controller 32 acting in concert with the sequence controller 33 (e.g. when the head is passing over a burst pattern on the disk). The digitized output of ADC 36 is provided to a divider 40. The divider 40 divides the signal by a digitized normalization value stored in memory 38. The output of divider 42 is provided to a subtractor 40, which subtracts the digital input value from a reference value retrieved from memory 38 to create the position error signal (PES). These functions are described in greater detail subsequently.

The PES is provided to a digital servo controller 44 which converts it into an appropriate corrective control signal. The corrective signal is then converted to analog form by a digital to analog converter (DAC) 46, and is further amplified and converted to a current by a VCM driver 48. The driver current is applied to voice coil actuator 24 in the disk file causing recording transducer 22 to move approximately radially with respect to recording medium 26.

Sequence controller 33 provides computation capabilities for general use in determining modifications to the stored reference table values, for determining appropriate delay settings to be applied to timing delay unit 31, and for producing control signals for pattern generator 30. Preferably, the functions of divider 40, subtractor 42, and digital servo controller 44 are all achieved through the appropriate programming of sequence controller 33.

Figure 3A:
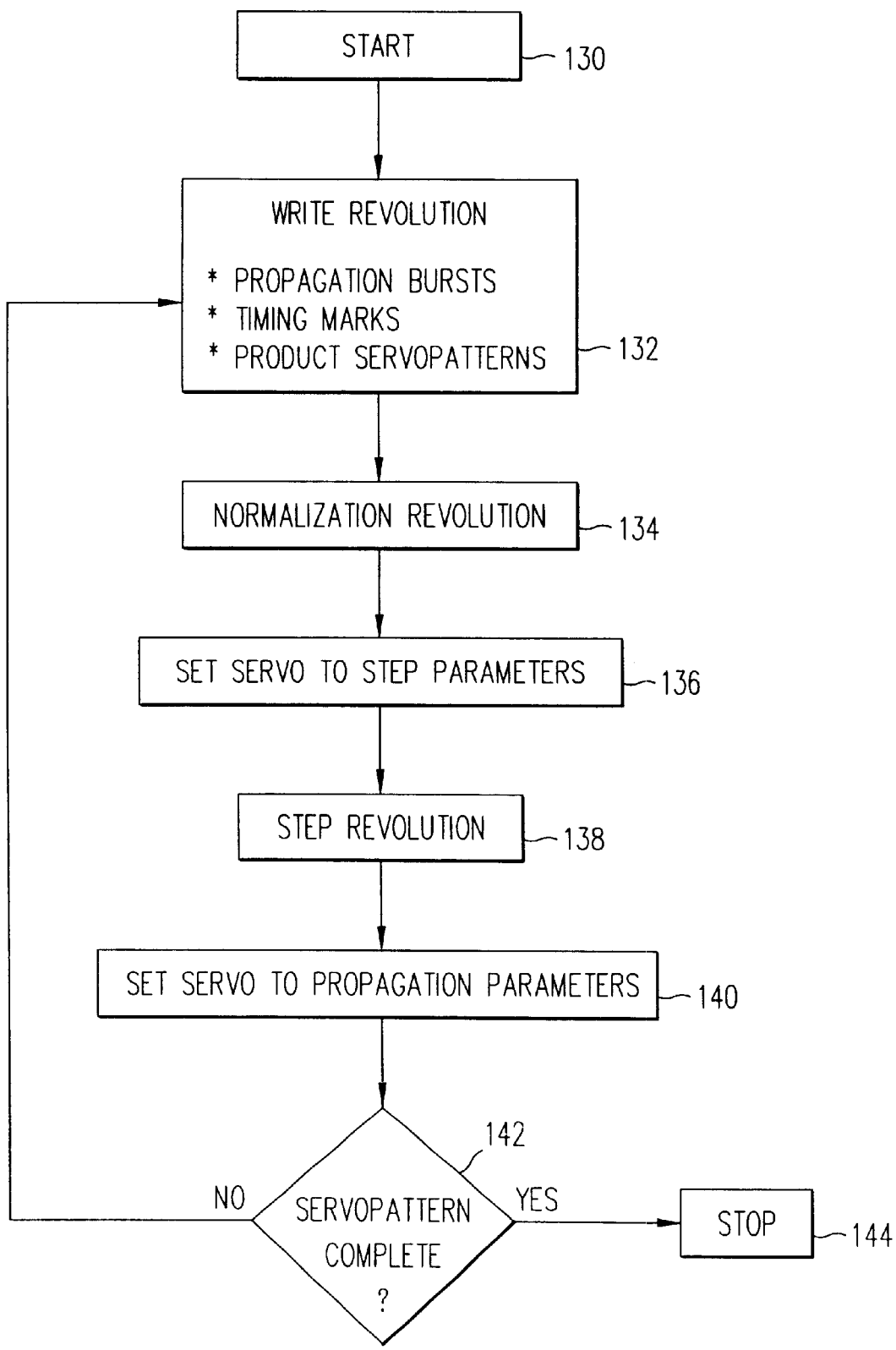
FIG. 3A is a flow diagram of the basic process steps for a self-servowriting system suitable for practicing the present invention.

The next revolution of the disk is referred to as a normalization revolution and is indicated as step 134 in FIG. 3A. In this step, the head is in read mode and sequence controller 33 signals the ADC 36 to sample and digitize the demodulated readback signal during the first slot of each sector, i.e., the "A burst". These digital sample values are stored in a propagation burst amplitude normalization table in memory 38. (See table 360 in FIG. 3B). An improved normalization method is disclosed in related copending U.S. Pat. No. 5,875,064, filed concurrently herewith. Region 104 is reserved for use by the precision timing propagation system and for actual product servopattern, which includes, for example, sector ID fields and a pattern such as an amplitude burst or phase encoded pattern. Preferably, propagation burst areas 103 will be overwritten with user data after servowriting. All of region 104 except for the part containing the product servopattern will also be overwritten with user data.

Figure 2:
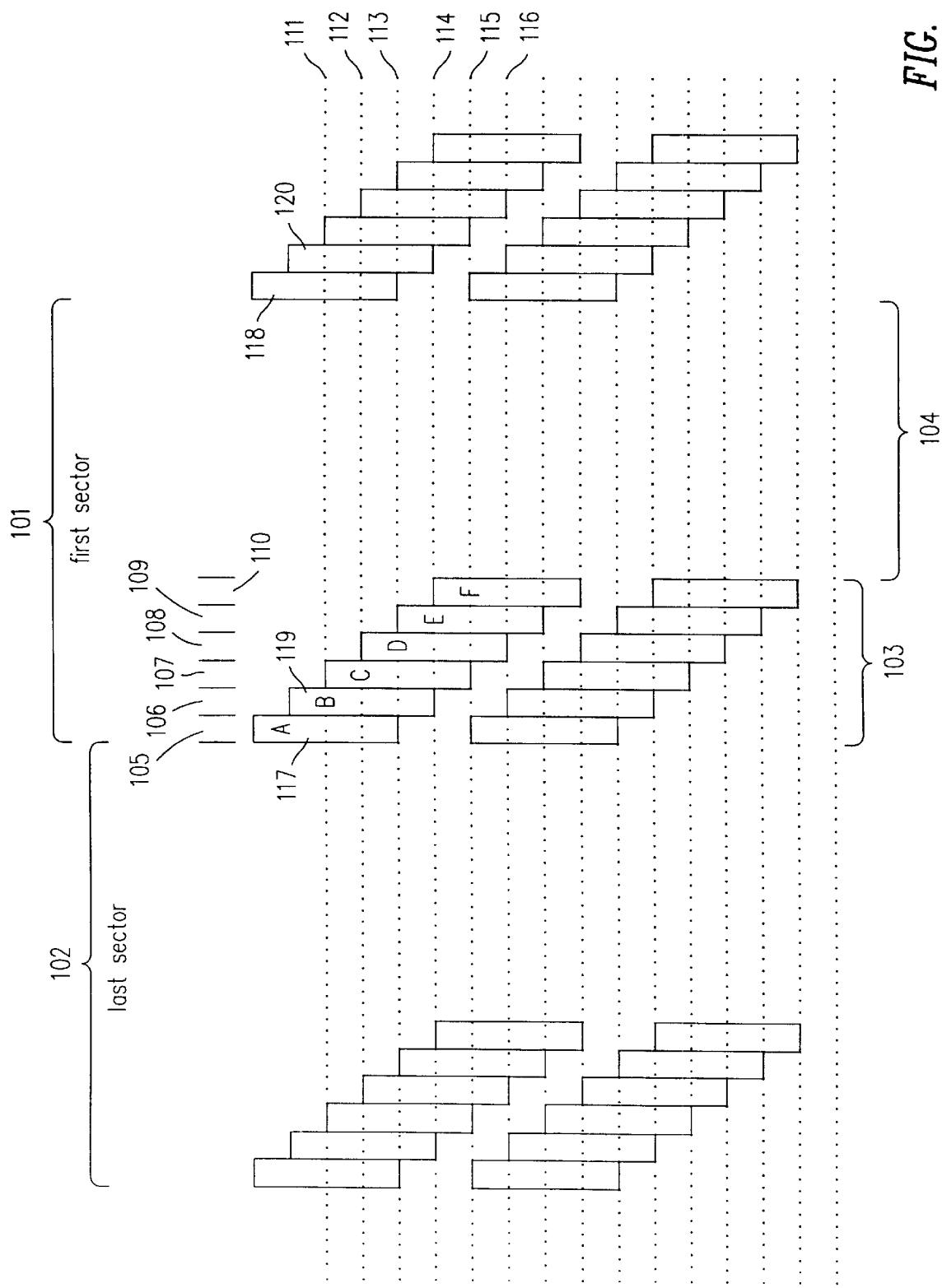
FIG. 2 is a diagram illustrating the relationship between propagation tracks, disk sectors and propagation bursts in a self-servowriting system suitable for practicing the present invention.

Each propagation burst region 103 is further divided into a number of slots 105–110 within which propagation bursts (A,B,C,D,E, and F) are written. The propagation track pitch in FIG. 2 is preferably one-quarter of the assigned data track pitch. That is, if the first user data track is centered on propagation track 112, the next data track will be centered on propagation track 116 providing a ¼ track separation between the propagation tracks 113 and 114, and so on across the disk. The preferred propagation burst pattern consists of a repeating sequence of 6 bursts as shown in FIG. 2. This is useful because the bursts, which are non-overlapping in the radial direction, allow the recording transducer to radially back up and check previously written bursts.

A typical number of sectors is 120 and a typical disk rotation rate is 5400 rpm, translating into about 92 microseconds per sector. A typical slot time, i.e., the duration of time for the slot to pass a fixed point of reference in the circumferential direction, is 7 microseconds. The slot time is preferably longer than the duration of a product servopattern burst, since longer bursts extend filtering time during demodulation. More filtering time results in a higher signal to noise ratio, which simplifies some of the digital servo loop computation, particularly with regard to determining derivative or velocity related servo terms. Moreover, there is no loss of user data space with expanded propagation bursts since they will be overwritten later. However, it will be understood that shorter burst times may be used if more time is needed for timing marks and product servopattern writing to regions 104.

Referring now to FIG. 3A, an iterative self-propagation process is shown. Before writing any servo position signals, a clock pattern is written using the storage device transducer. The frequency of the clock signal and the speed of rotation of the storage medium is defined such that the clock pattern has a predetermined number of transitions per revolution to provide an integer number of transitions per sector. In a first step 130 of the servowriting process, the recording transducer is located at either the outermost accessible track (OD) or innermost accessible track (ID) of the disk file with the actuator being pushed against a physical stop to lock it against mechanical disturbances. In a next step 132, a first propagation track 111 (FIG. 2) is written with A bursts in the first slot of each propagation burst region. Also, the first portion of the product servopattern is written within region 104 of each sector together with the precision timing marks. These preferably occupy only a small portion at the beginning of region 104 on the same surface as the propagation burst patterns and are written during the same revolution of the disk. If other recording surfaces are to be written within a stack of disks, these are preferably written next with product servopatterns (but not timing marks) in successive disk rotations by switching the write electronics to select each recording transducer in turn. The first revolution, or series of revolutions for multiple disks, is referred to as a write revolution.

The next revolution of the disk is referred to as a normalization revolution and is indicated as step 134 in FIG. 3A. In this step, the head is in read mode and sequence controller 33 signals the ADC 36 to sample and digitize the demodulated readback signal during the first slot of each sector, i.e., the "A burst". These digital sample values are stored in a 3 propagation burst amplitude normalization table in memory 38. (See table 360 in FIG. 3B). An improved normalization method is disclosed in related copending application Ser. No. 08/677,148, filed concurrently herewith, now issued as U.S. Pat. No. 5,793,554.

After all sectors have been read in the normalization revolution but before the first propagation burst region 103 of the next revolution, parameters used in the servo control voltage calculation are set equal to predetermined values ("step parameters") that provide rapid motion and settling. This is shown as step 136 in FIG. 3A. As an example, servo parameters similar to those used in the operation of the disk file would work well as step parameters.

Figure 3B:
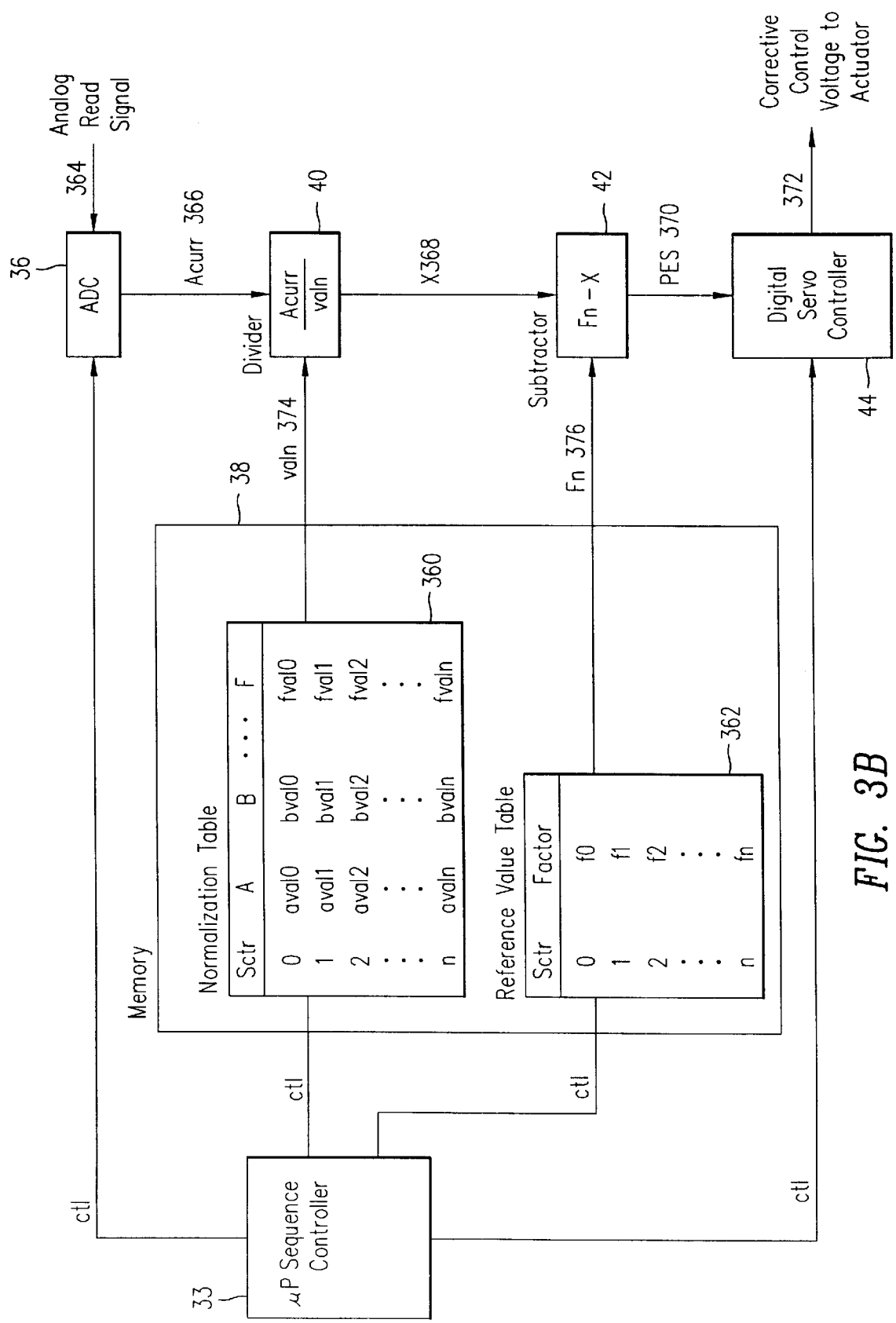
FIG. 3B is a detailed functional block diagram of the preferred servowriting system for implementing the present invention.

The next revolution of the disk is referred to as a "step revolution" and is shown as step 138. Some of the key servowriting elements involved in the execution of this step are shown in FIG. 3B. Referring to both FIGS. 3A and 3B, at the beginning of the step revolution 138, memory 38 contains not only the normalization table 360, but also a preloaded reference value table 362 holding a list of reference values, f0–fn, for each of the sectors, 0–n. Initially, the reference values, f0–fn, are all assigned to a same value representative of the anticipated amplitude reduction of the readback signal if sensed from the next propagation track 112. During the step revolution 138, sequence controller 33 steps through the normalization table 360 and the reference value table 362 sector by sector, routing an appropriate normalization value, valn 374, to the divider 40 and a corresponding reduction factor, Fn 376, to subtractor 42. During the first iteration of the servowriting sequence, the set of normalization values obtained from the A bursts, ava10-avaln, will be used. Concurrently, ADC 36 continues to digitize the readback signal 364 from the A bursts under the sequence controller's 33 direction, producing readback signal Acurr 366 having an amplitude of some magnitude. The divider 40 receives Acurr 366, divides it by the normalization value, valn 374, and provides the result, a propagation burst fractional amplitude X 368, to subtractor 42. The subtractor 42, in turn, receives X 368, and subtracts it from the reference value, Fn 376. The result provides a position error signal, PES 370, which will be available at the subtractor 42 output when recording transducer 22 reaches the end of each propagation burst region 103. At this time, sequence controller 33 signals digital servo controller 44 to read the PES 370 and to compute a new control voltage setting. The control voltage 372, adjusted after each sector, drives actuator 24 in a direction that reduces the PES 370, i.e., toward propagation track 112.

The actuator 24 typically settles onto the next propagation track 112 in about one quarter of a disk revolution. At that time, in a next step 140 of FIG. 3A, the parameters of the servo control voltage calculation are assigned a different set of parameters, i.e. "propagation parameters". The propagation parameters are tailored to provide rejection of mechanical disturbances without amplification of track shape errors. The manner in which they are determined will be described subsequently. Even though the step to the next propagation track takes less than a full revolution, it simplifies matters to allow the revolution to complete before writing the next set of bursts.

At this point only a single propagation track has been written so the result of a decision step 142 comparing the number of data tracks written with the total number of tracks to be written is necessarily negative and the process returns to write revolution step 132. In this second write revolution, the sequence controller 33 signals pattern generator 30 to write bursts of transitions, B, in the second slot of each sector. As before, precision timing marks and product servopattern are written in regions 104 on the same recording surface, and only product servopattern on the remaining recording surfaces. Throughout this write revolution, ADC 36 continues to digitize the A bursts and servo controller 44 maintains actuator 24 in a position such that transducer 22 stays close to the desired location of track 112. The PES values obtained during this write revolution are recorded in a table in memory 38 for later use in calculating new reference values.

The next revolution is again a normalization revolution, step 134. In this iteration, the ADC 36 digitizes both the A & B burst amplitudes, storing the B burst amplitudes in the normalization table 360. Meanwhile, the servo loop continues to track follow using PES values computed from the A burst amplitudes, the stored A burst normalization values, and the stored reference values. Preferably, new reference values are also computed during this revolution. Each new table value is set equal to a nominal average reference value determined previously to be appropriate for the desired average track spacing in this region of the disk, plus a correction value. The correction value may comprise, for example, a predetermined fraction of the previously stored PES value for the corresponding sector obtained during the preceding write operation. Alternatively, it is computed using a digital filtering algorithm which is dependent on the closed loop transfer function of the servo loop, as described in the referenced co-pending applications. The algorithm is applied to the entire set of PES values stored during the preceding write revolution. Preferably, corrective value calculations are initiated during the write revolution 132 and completed sector by sector during the step revolution 138, updating the reference value table just prior to computation of the control voltage.

Switching now to the B bursts for PES computations, the process repeats, i.e., another step revolution is executed (step 138) wherein transducer 22 steps to the next propagation track, followed by a write revolution, step 132, in which C bursts, timing marks and product servopatterns are written. This continues (with A bursts following F bursts) until the desired number of data tracks have been written, resulting in a yes answer at decision step 142 and terminating the process at step 144.

Figure 4A:
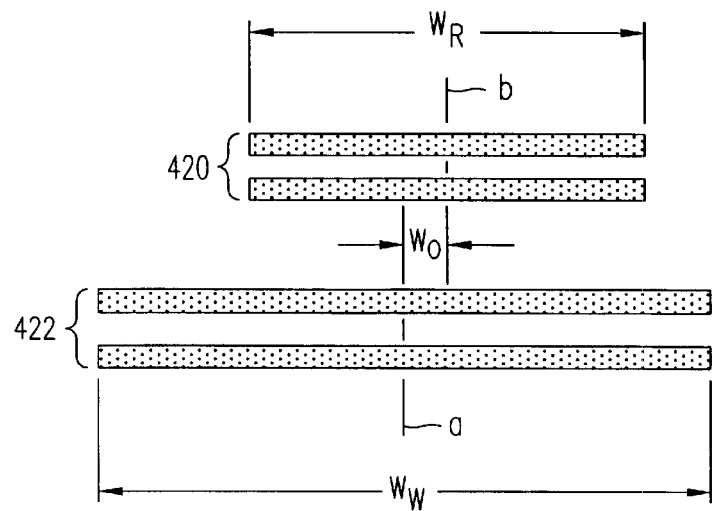
FIG. 4A shows the relative offsets of the read and write elements in a dual element head suitable for practicing the present invention.
Figure 4B:
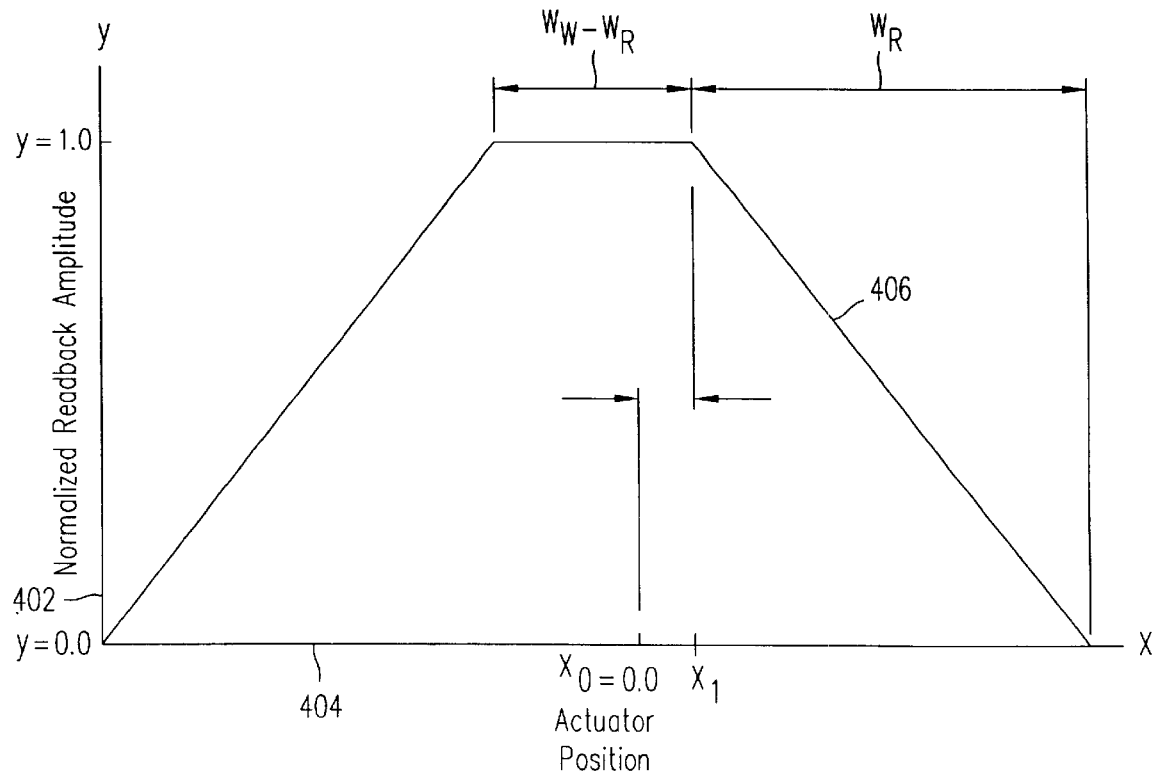
FIG. 4B is a graph illustrating a variation in readback signal amplitude as the actuator changes position across the disk in a self-servowriting system suitable for practicing the present invention.

In the discussion so far, it has been assumed that the recording read transducer and write transducer are one and the same, as in the typical inductive read/write element commonly used. Relatively recently, however, "dual element" transducers employing separate read and write elements such as magneto-resistive (MR) transducers have come into use, and require special attention with regard to the determination and control of propagation track spacing by means of nominal average reference value settings. FIG. 4A is a representation of an MR transducer wherein the read and write elements, 420, 422 have different widths, Wr and Ww, respectively, and a relative offset, Wo, between their respective central axes, a and b. FIG. 4B graphically represents a variation in the normalized readback amplitude from the read element 420, and the effect of the head offsets. Readback amplitude is indicated along the y-axis 402, with change in the position of the actuator indicated by the x-axis 404. The actuator position Xo=0.0 corresponds to the actuator position during a write operation. The flat portion of curve 406 represents the range of actuator movement in which the read element is radially aligned inside the written pattern to produce the best readback signal, and is equal to Ww-Wr as indicated.

As should be apparent from FIGS. 4A and 4B, the actuator movement required to reach a particular level of amplitude reduction depends on read element width, write element width, relative offset, and direction of motion. It is desirable, however, that the propagation track spacing be determined only by the read and write element widths, and not by head offset, since the apparent offset of the heads in a rotary actuator disk drive changes as the actuator sweeps from the outermost to the innermost track in a disk file. That is, the spatial separation of the read and write elements along the actuator arm direction leads to different projected locations of these elements onto the disk track along the arc defined by the actuator arm motion. Dependency on read to write element offset may be eliminated in a manner which requires no prior knowledge of the precise geometry of the head and which can be achieved solely through measurements of the normalized readback amplitude or signal, as described in co-pending application Ser. No. 08/349,028. But for completeness, this approach will be described next with reference to FIG. 5.

Figure 5:
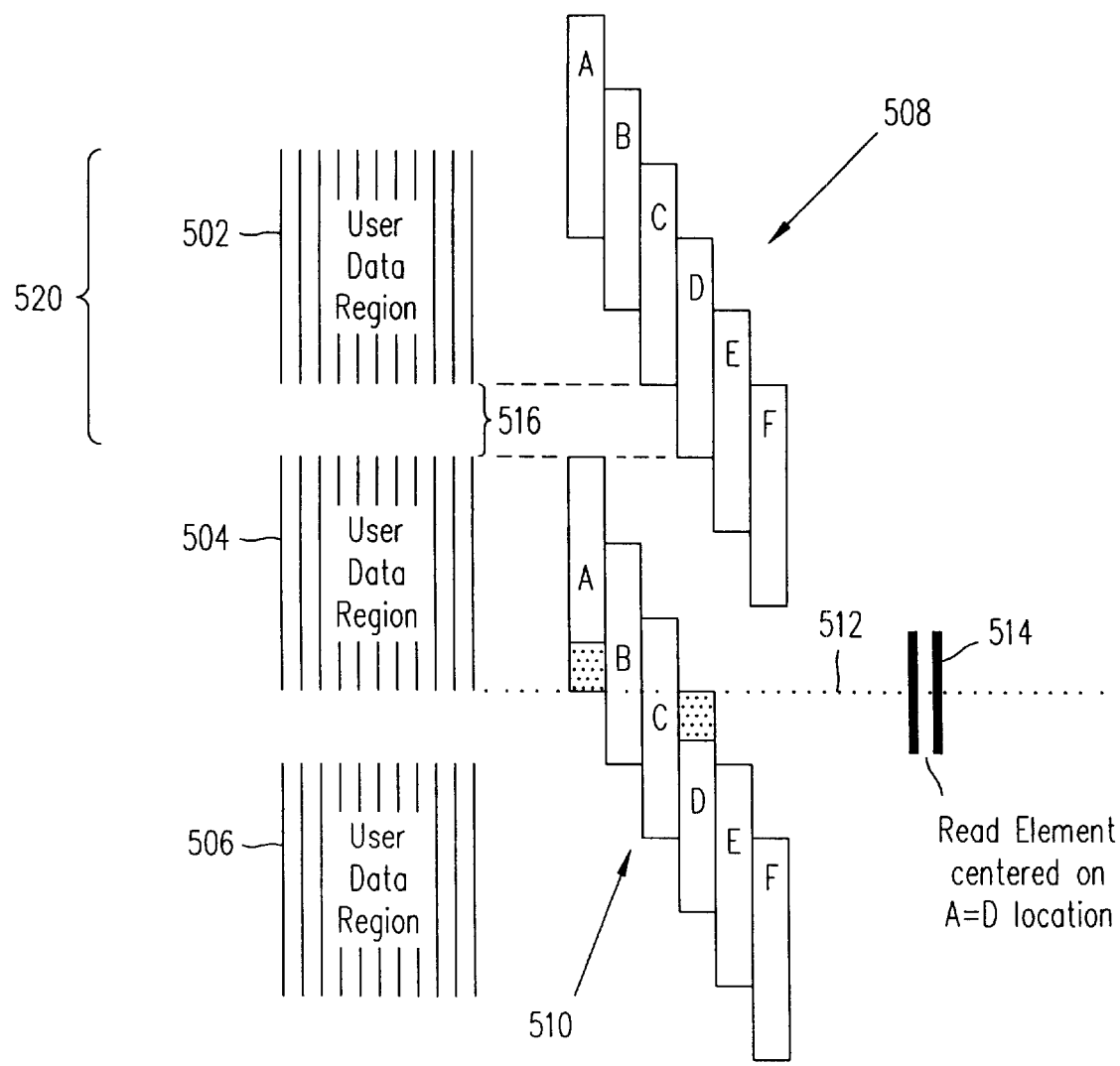
FIG. 5 illustrates the relative locations of the bursts in a six-burst propagation pattern suitable for practicing the present invention.

FIG. 5 illustrates the manner in which a six burst propagation burst region is used to write data tracks during self-servowriting. Each propagation burst (A–F) is radially displaced from an adjacent burst by a step comprising ¼ of the desired data track pitch. Track pitch 520 comprises the write element width (which determines the width of the data track) plus the desired radial distance or separation 516 between adjacent data tracks 502, 504. The radial track separation 516 should be sufficient to prevent accidental overwrite of adjacent tracks during a track write operation, as previously discussed. Since the bursts are radially spaced by ¼ of the desired track pitch, the write head is first aligned with burst A when writing data track 504. Next, the write head is aligned with a burst four steps or propagation tracks away, which in this case is burst E, when writing the next data track 506.

Pairs of burst patterns that are radially separated from one another by three ¼ track steps line up along a common edge. For example, propagation bursts A and D share a common edge along dotted line 512. Burst patterns 508, 510 are relatively positioned to preserve this relationship. For example, burst D of pattern 508 and burst A of pattern 510 are also radially aligned along a common edge.

If the read element 514 is positioned with respect to burst pattern 510 so that the normalized readback amplitude from burst A equals the normalized readback amplitude from burst D (the A=D position) then the relative normalized signal is 0.5 if the edges line up, greater than 0.5 if the edges overlap, and less than 0.5 if the edges have space between. Thus, the relative normalized signal at the A=D position may be used as an indicator of whether the propagation track pitch is too small or too large, and track pitch can be corrected by using this relative signal to adjust the nominal average reference value used to calculate reference values during propagation. If the normalized readback amplitudes vary linearly with position (a fairly good approximation, as shown in FIG. 4B), the adjustment in the nominal average reference value can be computed from the relative normalized signal at the A=D position. (See FIG. 6B.)

The relationship may be better understood by noting that a change in nominal average reference value by an amount r results in a change in the relative normalized signal at the A=D position of 3r/2, since each of the three steps, A to B, B to C, and C to D, contributes a spacing change equal to r, and these changes are shared equally by A and D. The nominal average reference level should therefore be adjusted by an amount equal to ⅔ of the deviation of the relative normalized signal at the A=D position from its desired level.

Figure 3C:
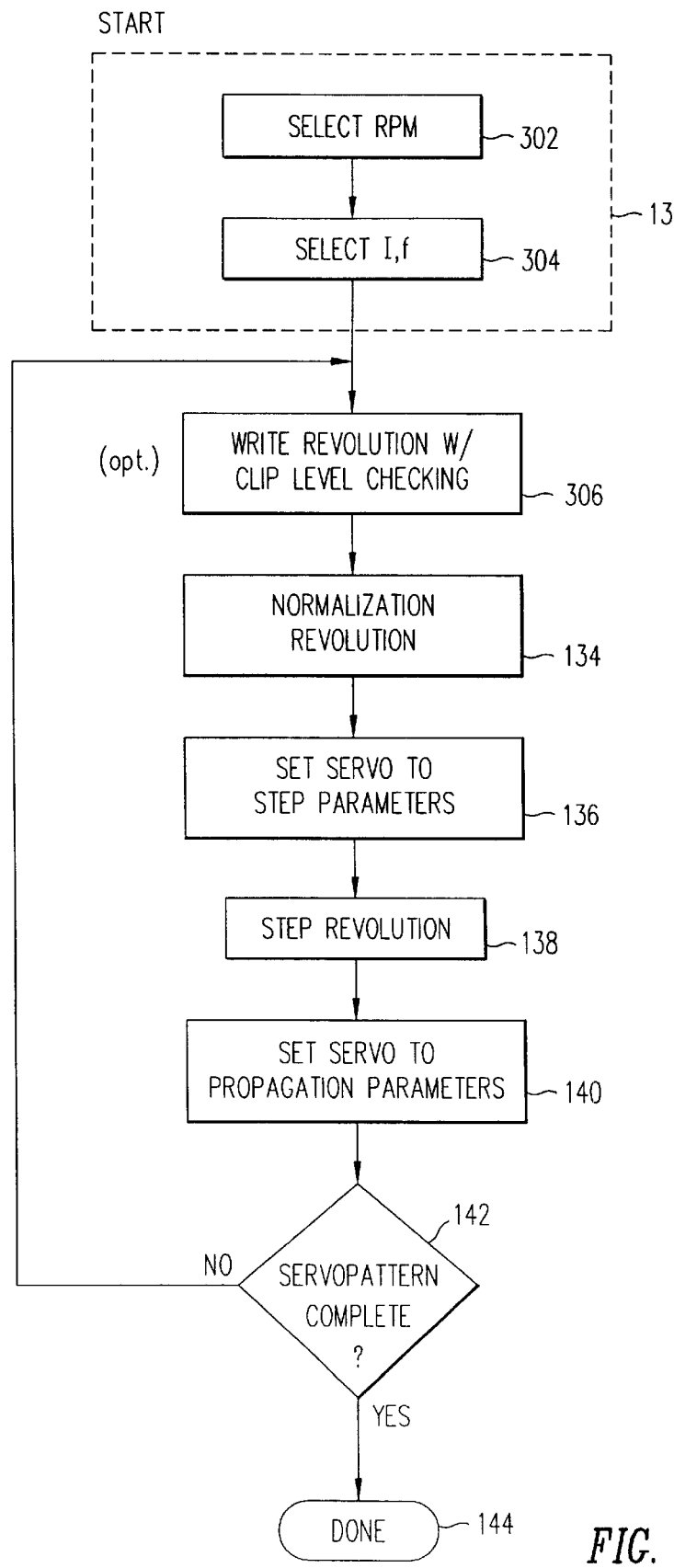
FIG. 3C is a flow diagram for a self-servowriting system incorporating the improvements of the present invention.

Returning now to the self-servowriting process, the improved servowriting sequence is illustrated in FIG. 3C. The sequence is similar to that of FIG. 3A. However, the start block 130 now includes a step 302 for selecting an RPM to reduce random mechanical noise, and a step 304 for selecting a write current I and write frequency f to reduce write width modulation. In addition, the write revolution 306 of this sequence includes clip-level checking. These modifications will be described in greater detail below.

II. Reduction of Write Width Modulation

II.A. Background Information

Variations in the width of written servo bursts, referred to as write width modulation, may vary the location of propagation burst edges relative to track center, as shown in FIGS. 6A and 6B. The source of write width modulation may be mechanical, e.g. due to variations in fly height, or magnetic, e.g. due to variations in magnetic properties across the storage medium. FIG. 6A shows a circumferential region of the track where the widths of bursts A, B and C are narrower than average and FIG. 6B shows a circumferential region of the same track where the burst widths are wider than average. Variations in propagation burst width cause a corresponding variation in the readback signal amplitude derived from the burst pattern. Since the normalized readback amplitude is indicative of transducer 620 position relative to the storage medium, the variation will provide an erroneous position reading. This, in turn, will cause modulation of the PES resulting in inappropriate adjustments to the transducer 620 position.

Figure 7:
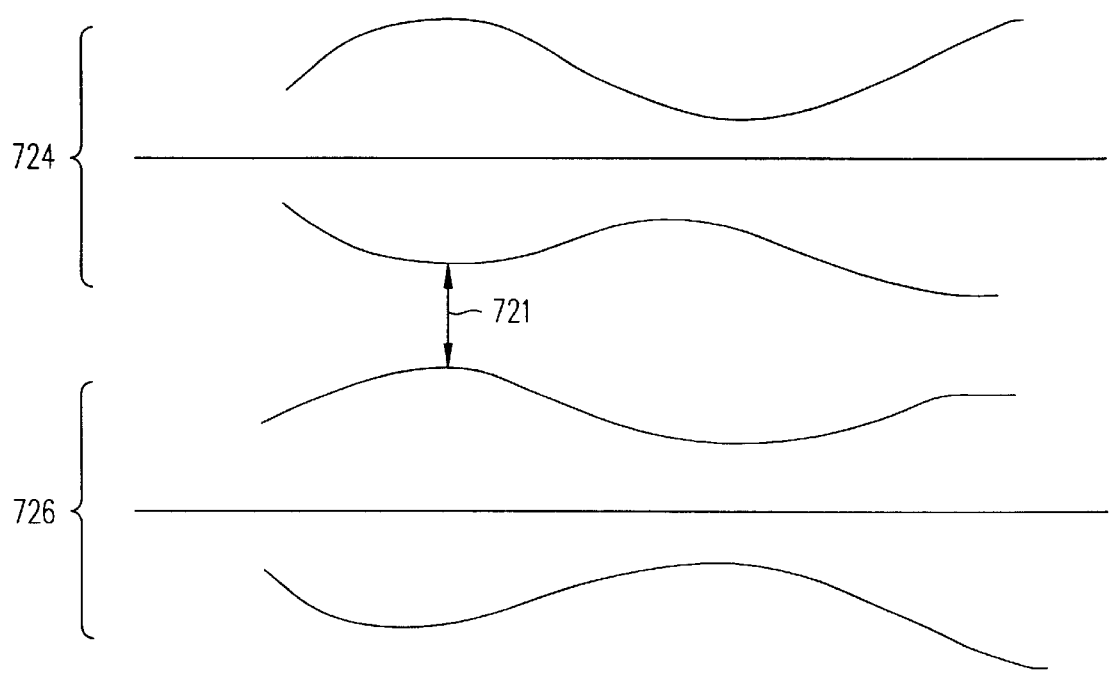
FIG. 7 illustrates track squeeze resulting from write width modulation.

A representation of a pair of propagation tracks 724, 726 showing the effects of write width modulation is provided in FIG. 7. As is readily apparent, the write width modulation may cause the separation 721 between adjacent tracks to fall below acceptable margins. This phenomenon is referred to as "track squeeze" and may result in inadvertent overwriting of an adjacent track.

II.B. Improvement for Reduced Modulation Errors

In an attempt to minimize the effects of write width modulation, an improvement is proposed for the described self-propagating system. Through observation it has been determined that write width modulation varies with write frequency and write current. Variations of the write frequency and write current values from the optimal values of these operating parameters generate input noise in the servowriting process. Hence the improvement comprises optimizing these parameters by empirically determining a combination of write current and write frequency values which minimizes the input noise as indicated by the measured occurrence of write width modulation. Input noise refers generally to those sources of error that are not direct input parameters that control the relevant output parameter. For example, the position of servo bursts is directly determined by VCM driver 48, however variations in write current and write frequency generate input noise which causes small variations in the servo burst position. Optimization may be performed, for example, during the start sequence (step 130) of self-servowriting, or alternatively, when the storage device is being manufactured.

Figure 3D:
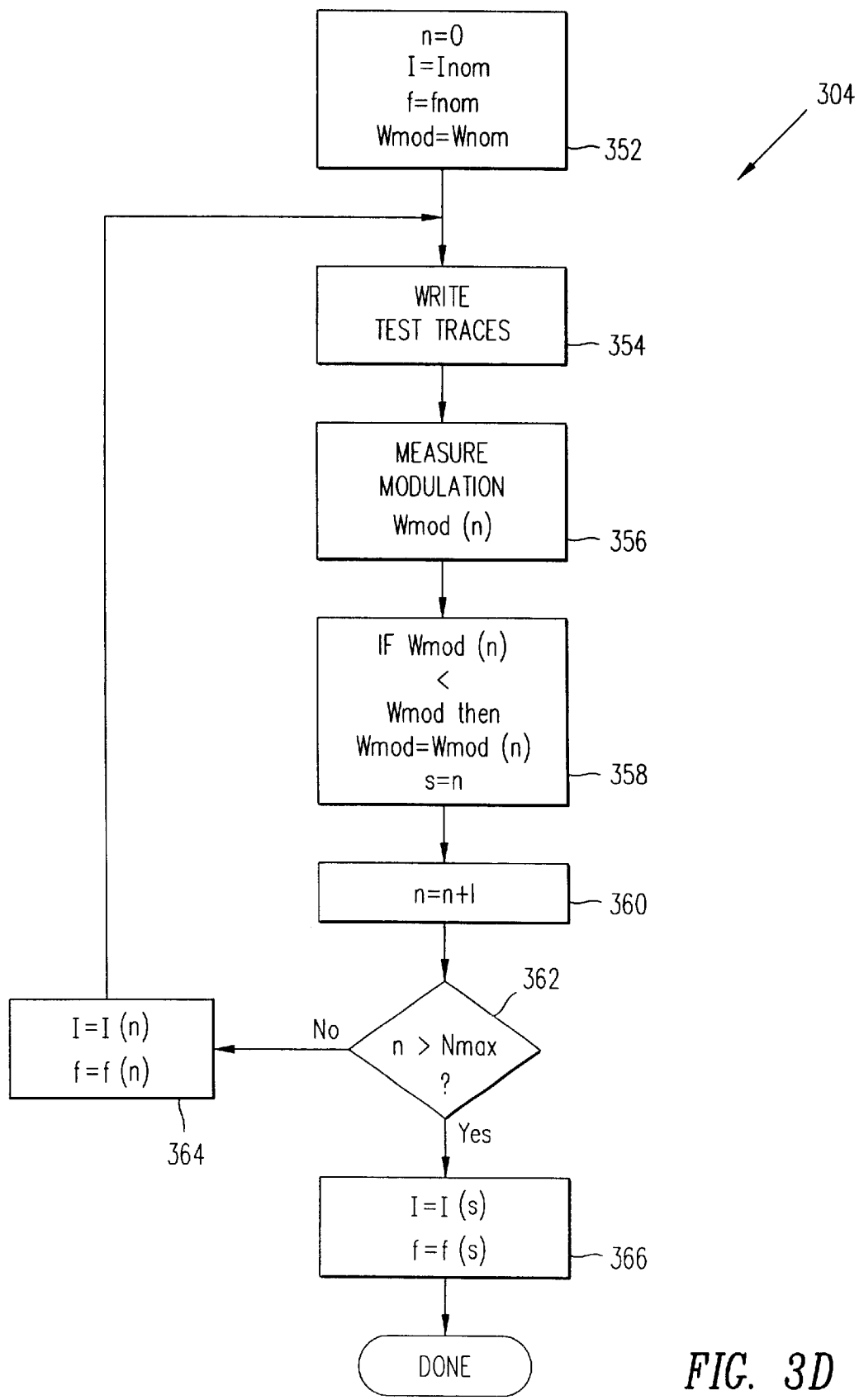
FIG. 3D is a flow diagram of the preferred sequence for selecting write current and write frequency according to the teachings of the present invention.

An example of an optimization sequence suitable for practicing the proposed improvement is shown in FIG. 3D. First, an index n is initialized to zero, and the frequency, current, and write width modulation are set to predetermined nominal initial values fnom, Inom, and Wnom, as shown in step 352. Although the sequence of FIG. 3C is described in terms of a single index, n, it shall be understood that this implementation was chosen for simplicity of explanation, and that nested looping with separate indices for frequency and current may be used if desired to maximize the number of current/frequency combinations tested.

In a next step 354, a plurality of propagation tracks are written to the disk, and the resulting average write width modulation, Wmod(n), is measured (step 356), in a manner to be described subsequently. Next, if the measured write width modulation Wmod(n) is less than the previously obtained value (or in this case, the initial value) of Wmod, Wmod is assigned the newly measured value and the corresponding index value is saved for later reference (step 358). In a next step 360, the index is incremented by one and compared to the maximum index value to determine whether testing is complete. If testing is not complete, the test traces are erased and the write current and write frequency are assigned to a new set of values, f(n) and I(n) (step 364). Steps 354–362 are then repeated until testing is completed. At that time, control flows to step 366, wherein frequency and current are assigned to the values I(s) and f(s), which correspond to the smallest Wmod measured during testing. modulation.

Write width modulation is measured by track following with any dual burst form of servo, e.g. A=C, A=D, etc, and comparing the relative normalized readback signal to a nominal readback signal. A nominal readback signal is simply the relative normalized signal expected when the propagation bursts are properly aligned with respect to track center 622 and are of an ideal or average width (transverse to the track). Referring back to FIGS. 6A and 6B, it can be seen that the sum of the burst readings, A+C, decreases relative to that of nominal burst readings where tracks widths are low, and increases where tracks widths are high. Thus the variation of A+C around a track is an indicium of repeatable write width modulation. Of course, the measurement on any single track may include nonrepeatable components that are due, for example, to mechanical disturbances. However, such random errors necessarily average to zero over groups of tracks. Thus this component may essentially eliminated by taking a sector by sector average of the A+C over a group of tracks. For averaging, the number of tracks will depend upon variables such as servo system bandwidth and track density. For example, averaging over 50 tracks was found to sufficiently reduce the nonrepeatable component in a disk drive having 89 sectors and a track density of 5250 tpi.

III. Measurement of Closed Loop System Response

As described in copending application Ser. Nos. 08/349,028 and 08/08/405,261, the net effect of the written burst location errors is to produce a non-circular trajectory that the servo loop attempts to follow. Hence the errors act as an additional reference signal. The response to the non-circular trajectory is given by the closed loop response of the system. Normally, it is desired that the closed loop response of a servo loop be exactly equal to unity (in which case the controller gain would approach infinity). Such a system produces an output that exactly follows the desired trajectory and is infinitely stiff against disturbances.

In reality, only a finite controller gain can be used, and it must be frequency dependent to avoid loop instability arising from unavoidable phase shifts (i.e., positive feedback). In typical servo loop applications, including disk file actuator servos, the primary performance objective is to provide optimal rejection of mechanical disturbances within the constraints of a finite sampling rate, and the resulting closed loop response rises significantly above unity (1.5 or more) over a fairly broad range of frequencies. No drastic consequences arise from this approach during disk file operation.

In self-servowriting, however, the response to a non-circular trajectory at a given propagation track is reproduced in the writing of the next propagation track, and that response is reproduced yet again on the next propagation track. Since the closed loop response corresponds to a step-to-step error amplification factor, an error at one propagation track will appear N propagation tracks later as the error multiplied by the closed loop response raised to the Nth power. Thus, if the magnitude of the closed loop response exceeds unity, any error will grow indefinitely. On the other hand, if the closed loop response is less than unity, errors are still compounded, but the effect of an error at any one step eventually decays. Thus error compounding is effectively limited to a finite number of steps n.

Roughly speaking, n is given by unity divided by the amount by which the closed loop response differs from unity. For example, a closed loop response of 0.99 yields n=100. Systematic errors such as written track width modulation will therefore grow by a factor of about n. Under these conditions, the track to track error is still quite small, and only the less stringent limit on absolute track circularity need be considered. Since the effect of written track width modulation is limited to a small percentage, a substantial growth can be tolerated without exceeding the absolute circularity limit of roughly one track spacing. However, it is desirable to measure and minimize the write width modulation to produce the minimum non-circularity by adjustment of write current or frequency or both, as previously discussed.

Viewed as a time waveform, the written burst location error trajectory is a perfectly repetitive function with a repeat frequency equal to the rotation frequency of the disk. A principle of Fourier analysis is that any such repetitive waveform has a frequency spectrum containing non-zero amplitudes only at the discrete set of frequencies corresponding to integer multiples of the repeat frequency, in this case the disk rotation frequency. Thus, the relevant frequencies at which the closed loop response must be kept below unity are all integral multiples of the disk rotation frequency. As a frequency dependent quantity, the closed loop response C is actually a vector of complex numbers having both a magnitude and a phase, with each element of the vector corresponding to a particular multiple of the rotation frequency. It is the magnitude of each element of the vector that must be less than unity.

Choosing the servo loop parameters to ensure that the closed loop response is less than unity during writing is a simple method that provides a substantial reduction in random mechanical motion while ensuring that error growth is bounded. But the inclusion of correction values when computing new reference values in step 140 of FIG. 3A, alters the situation. As previously discussed, each new reference track table value is preferably set equal to a nominal average reference value plus a corrective value. Also previously noted, the corrective value may simply comprise a predetermined fraction, f of the previously recorded PES value for the corresponding sector. This approach is relatively straightforward, since the PES readings are utilized directly as a time waveform. In this case, the step-to-step error amplification factor, S, no longer equals the closed loop response, C, as it contains an additional term equal to $f(1-C)$. Consequently, $S=C+f(1-C)$ must have a magnitude of less than unity at all integral multiples of the rotation frequency.

In the formula above, S, like C, is a vector of complex elements, while the factor f, being frequency independent and containing no phase shifts, is a single, real-valued term. As such, it is not possible to find an f wherein the magnitude of every element of the vector S is less than unity (except for special cases, e.g. when the magnitude of all elements of C are all >1 or all <1). Thus, calculating corrective values as a fraction of the previous PES values is useful in certain circumstances and offers the virtue of simplicity, but fails to provide a general capability of ensuring bounded error growth together with high gain servo performance in which the magnitude of C exceeds unity at some, but not all frequencies.

These shortcomings may be resolved by treating the vector of previously recorded PES values as a repetitive time waveform and by digitally filtering it to produce the reference table correction values. This method is equivalent to generalizing the factor f, such that it also becomes a vector with complex-valued elements. Many possibilities for a digital filtering algorithm exist, but one which provides total flexibility for choosing f at all necessary frequencies (i.e., multiples of the rotation frequency) is to compute the coefficients of the discrete Fourier transform of the waveform of PES values, multiply each by a complex-valued scale factor (the set of which comprise f), and then invert the transform using the scaled coefficients to produce a filtered time waveform. The new reference track table values are then computed by adding this filtered waveform to the nominal average reference level. A description of the discrete Fourier transform and the formulae associated with it can be found in "The Electrical Engineering Handbook" published by CRC Press of Boca Raton.

Rapid and efficient computation algorithms such as the Fast Fourier Transform may be used to perform the requisite calculations, but in practice it is found that only a limited number of frequency coefficients, corresponding to perhaps as many as the first 6 or 8 multiples of the rotation frequency, are usually required. To ensure bounded error growth, only frequencies at which the magnitude of the closed loop response exceeds unity need to be included. The factor f can equal zero for other frequencies, and corresponds to simply truncating the Fourier series transformations.

The filtering technique described above allows one to set specific values for the elements of S. The closed loop response can be adjusted by means of the servo parameters to provide a desired level of mechanical disturbance rejection, then the appropriate values for f can be computed using the formula $f=(S-C)/(1-C)$. Unbounded growth of errors is avoided by keeping the magnitude of all elements of the vector S less than unity, so this is a primary consideration. In considering the growth of systematic errors such as write width modulation, the error in track shape levels off at a value equal to the base write width modulation times $(1+C-S)/(1-S)$, where the base write width modulation is the amount of track width modulation that occurs at each write step. The net track shape error is therefore very large if S is close to 1. Conversely, the cumulative effect of random mechanical motion is magnified if the step factor is chosen to be nearly zero, especially if C is close to 1. This occurs because the factor f itself becomes very large if C is close to 1.

A particular choice of S that has been found to give excellent results with the disk files studied so far is 0.9. This reflects the fact that it is more important to keep random errors small than it is to maintain absolute circularity of the tracks. (However, minimizing the write width modulation term, reduces this effect and may allow choices of S which optimize rejection of random mechanical motion). Other choices of step factor S, including complex-valued ones, may prove to be optimum depending on the details of the disk file heads, recording media, and mechanical properties.

An improved method for measuring the closed loop response of a servo system during self-servowriting is disclosed in related co-pending U.S. Pat. No. 5,875,064, filed concurrently herewith.

IV. Optimization of RPM

IV.A. Background Information

Disturbances experienced by the described self-propagating servo system may cause the actuator to deviate from the ideal propagation track. These occurrences are referred to as track misregistration (TMR) and will result in mispositioned write bursts. Subsequent readback of mispositioned bursts in the next propagation cycle results in an offset or "modulated" position signal which is similar to the modulation resulting from write width modulation.

Figure 8A:
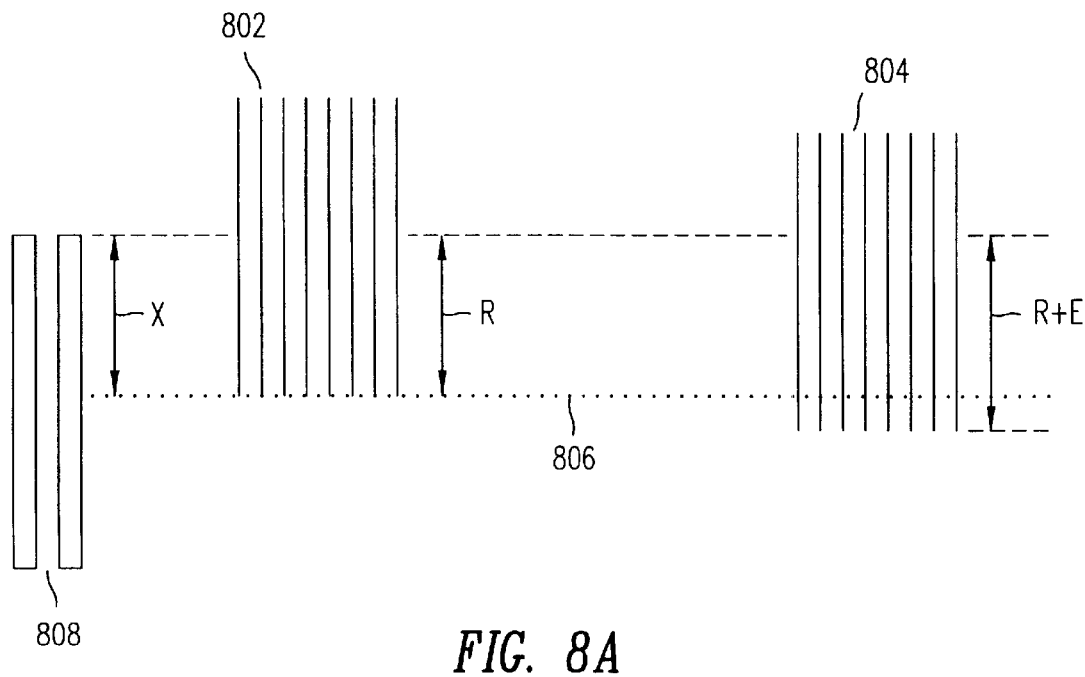
FIG. 8A is an illustration of a properly positioned product servopattern burst versus a radially offset burst.

FIG. 8A illustrates a properly positioned burst 802 and a mis-positioned burst 804 resulting from TMR. When centered on the desired propagation track a distance X from the preceding propagation track, the recording transducer 808 reads back a relative amplitude R for the properly positioned burst 802. Since this is the desired location, this relative amplitude equals the reference value, resulting in zero PES. However, the mis-positioned burst 804, having its edge shifted an amount E from the desired propagation track location 806 relative to the width of the transducer 808, results in a relative readback signal of R+E.

Figure 8B:
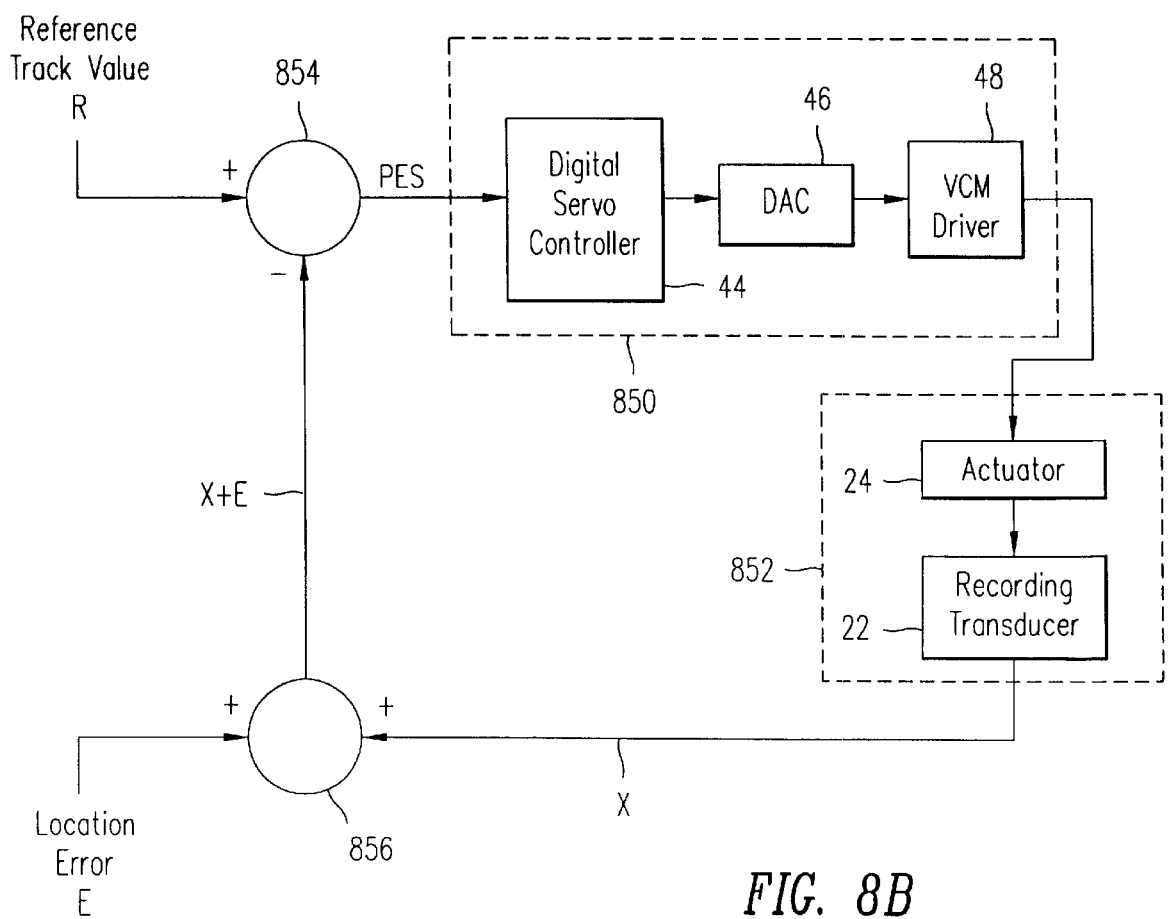
FIG. 8B is a control system diagram of a servo loop showing the manner in which the readback signals from the bursts in FIG. 8A are combined to form a position error signal suitable for practicing the present invention.

Referring now to FIG. 8B, a block diagram is shown of a servo control loop representative of the improved self-servowriting system of the present invention. Control systems are described generally in the book "Modern Control Engineering" by K. Ogata published by Prentiss-Hall corporation of Englewood Cliffs, N.J. The loop controller 850 comprises digital servo controller 44, DAC 46, and VCM driver 48. The "plant" 852 comprises actuator 24 and recording transducer 22. The plant output X represents the absolute position of the recording transducer in units of relative head width. During self-propagation, the only observable signal is the position of transducer 22 relative to recording medium 26, but it is useful to consider the absolute position X for the purposes of analysis of servo loop performance. A loop summing point 856 is explicitly included to account for the relative nature of the observed position signal. Thus the observed position signal equals the sum of the absolute position X and the burst position error E. This signal X+E is combined at a standard loop reference summing point 854 with the reference value R to form the position error signal or PES. In usual fashion the sign shown next to the incoming arrows at a summing point represents a sign factor to apply to each signal before summing, hence the PES equals R−(X+E).

Figure 9:
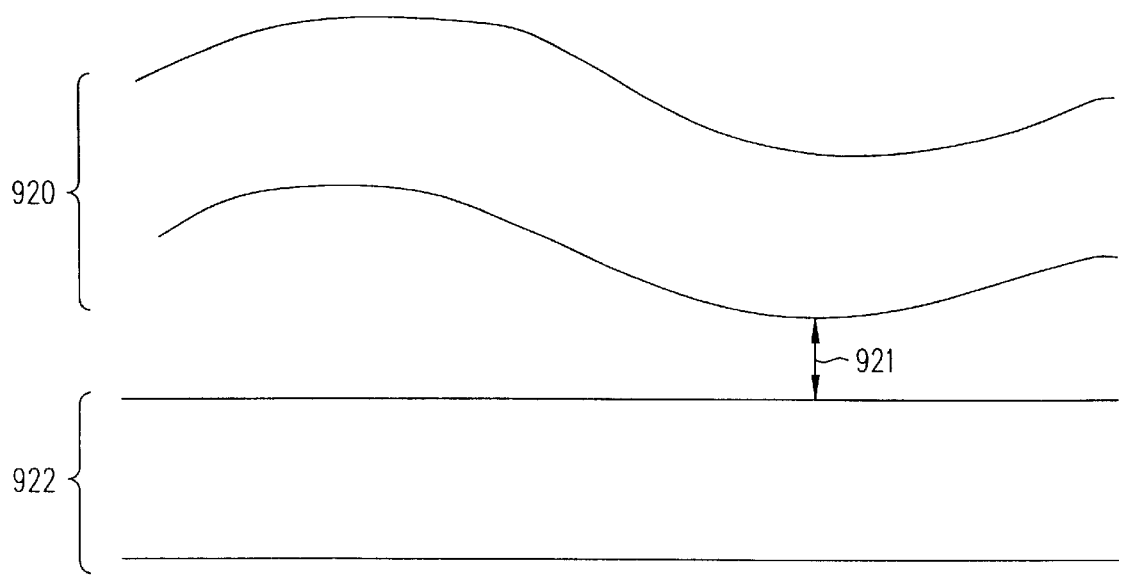
FIG. 9 illustrates track squeeze resulting from track misregistration.

An example of a propagation track 920 showing the effects of TMR is provided in FIG. 9 relative to an ideal propagation track 922. As is readily apparent, TMR may cause the separation 921 between adjacent tracks to fall below acceptable margins, i.e. "track squeeze".

IV.B. Improvement to Minimize Mechanical Noise

Another proposed improvement to the described self-propagation system for reducing the effects of mechanical disturbances is the minimization of random mechanical noise. This is achieved by empirical selection of the storage device RPM found to minimize the excitation of mechanical disturbances in the disk drive itself. Such selection is performed, for example, in the start sequence 130 of FIG. 3A, or alternatively, at the time of manufacture of the self-servowriting storage device. The principle of this invention may be applied to a variety of storage devices having rotatable storage mediums (e.g. disk drives and tape drives).

Figure 3E:
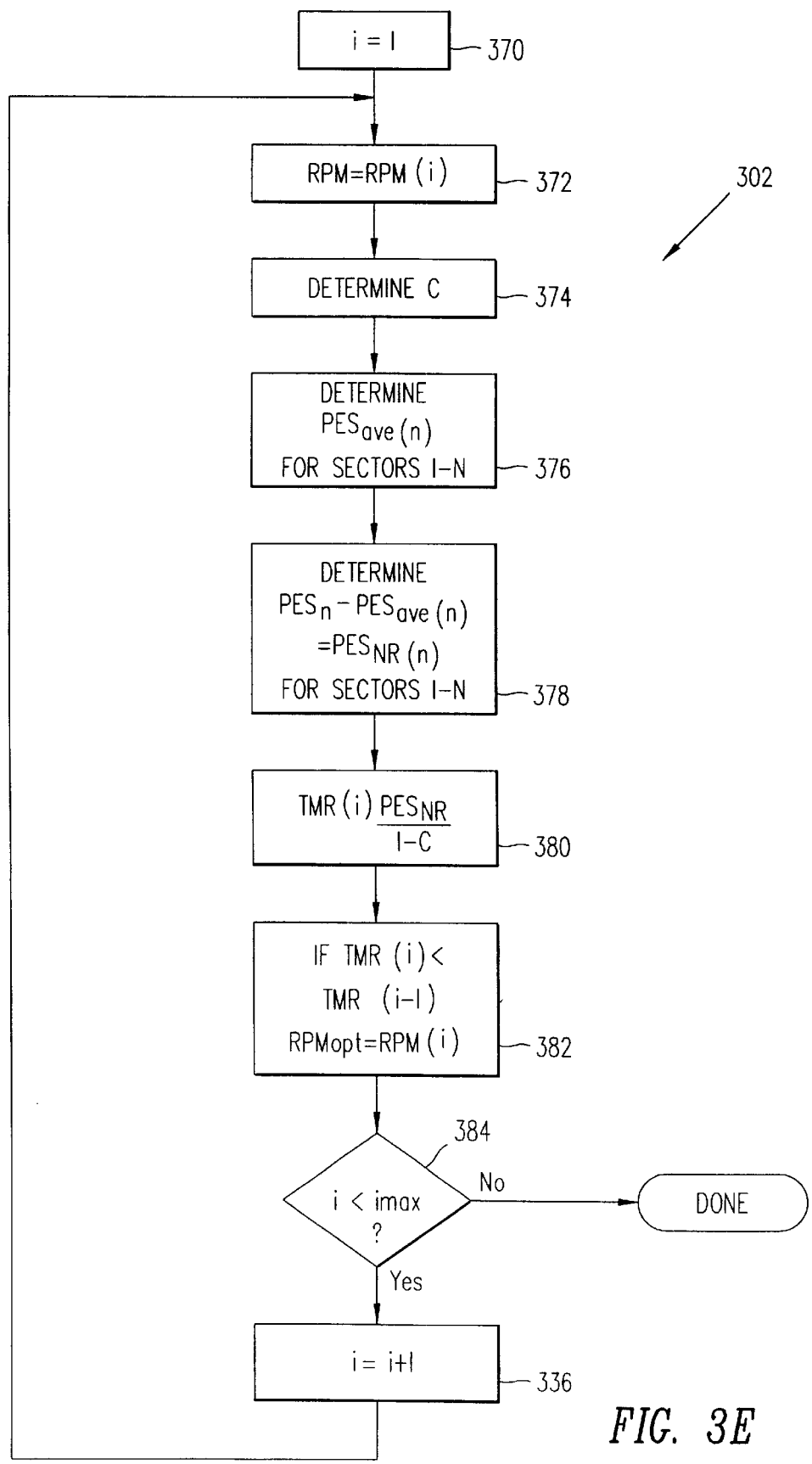
FIG. 3E is a flow diagram of the preferred sequence for selecting the RPM of a storage device according to the teachings of the present invention.

TMR is measured, for example, as described in U.S. Pat. No. 4,939,599, entitled Method and Apparatus for Measuring Dynamic Track Misregistration. TMR may also be determined from the servo position error signal. An RPM optimization sequence using the latter approach is shown in FIG. 3E. In the first two steps 370, 372, the disk drive RPM is set to a first of a series of RPM settings, RPM(I). Next 374, the closed loop of the servo system is determined as described previously. Alternatively, the closed loop measurement may be made for a nominal RPM prior to entering the optimization sequence. In the following step 376, the average position error signal PESave(n) for each sector 1−N is obtained by averaging the sector PES values over several rotations of the disk. Then the nonrepeatable components of the PES waveform, PESNR(n), are obtained in a next step 378 by subtracting each average PESave(n) value from its corresponding sector PES(n). The mechanical input noise or TMR indicator, TMR(I), for the current RPM setting, RPM (I) is then calculated from the non-repeatable part of the PES waveform by dividing by 1−C, as shown in step 380. In each iteration of the sequence, if the TMR indicator, TMR(I), has a smaller value than the TMR value obtained for the last RPM(I−1), then RPMopt is set to the present RPM setting, RPM(I) at step 382. If all desired RPM settings have been tested, i.e., i<imax 384, the sequence terminates. Otherwise, I is incremented and the sequence repeats for the next RPM setting, RPM(I). It shall be understood that a value for C other than unity may be selected to optimize the measurement of the mechanical noise input.

V. Clip Level Correction

Referring back to FIG. 2, the self-servowrite process writes propagation bursts in region 103 in the same revolution as it is generating the product servo patterns in region 104. While errors due to random mechanical noise are prevented from growing by the propagation algorithms described above, the product pattern will still contain the track to track random noise. In addition, if the system experiences a large mechanical input event, the product servopattern will also be written with the error.

Thus another improvement to the system is proposed wherein the effects of random noise mechanical disturbances on product servopattern are removed by providing clip level checking in the write revolution step 132. In the event that the PES records an error E greater then a specified tolerance, the process terminates and writing is inhibited until the PES returns to a value below the allowed clip level. On a subsequent revolution, the writing of servo patterns resumes, preferably at the same point where the write inhibit was invoked. Failure of the system to return below a predetermined clip level after a predefined period of time causes the self-propagation sequence to terminate. Hence addition of this step prevents large errors from being written into the product pattern.

VII. External-Servowriter Embodiments

Figure 10:
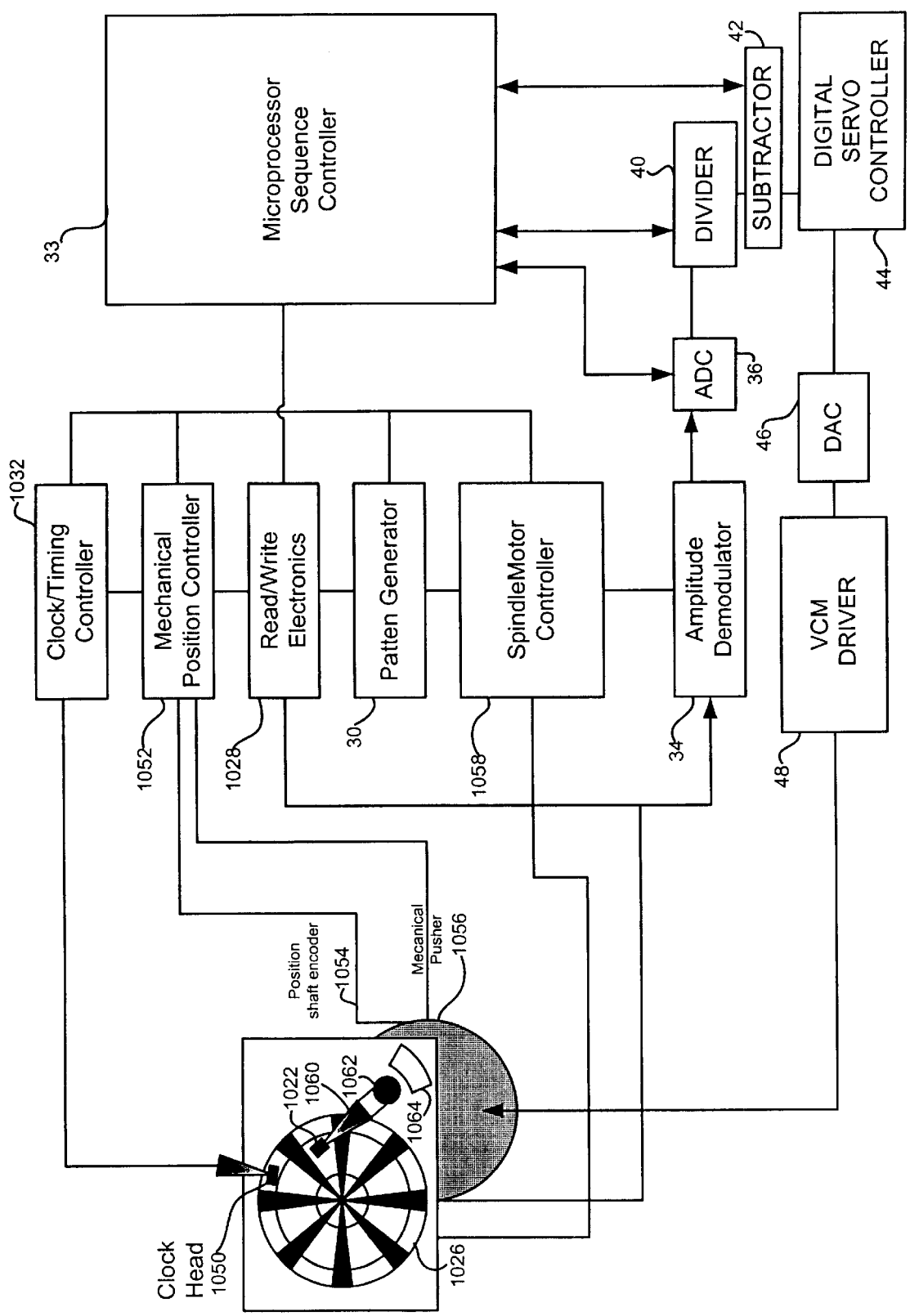
FIG. 10 is a block diagram of an external-servowriting system suitable for practicing a further embodiment of the present invention.

The present invention can be implemented in external-servowriting systems as well as the previously described self-servowriting systems. FIG. 10 is a block diagram of an external-servowriting system suitable for practicing an embodiment of the present invention. External-servowriters are well known in the art, as for example described in U.S. Pat. No. 4,371,902 which is expressly incorporated herein by reference. Therefore only a brief description is provided.

External-servowriter 1000 includes many of the same elements of the self-propagating disk drive servowriting system of FIG. 1 including: pattern generator 30, microprocessor sequence controller 33 and most of the other elements of the FIG. 1 embodiment. External-servowriter 1000 also includes a read/write electronics unit 1028, which performs comparable functions to the read/write electronics unit 28 located within the disk drive in the FIG. 1 embodiment. External-servowriter 1000 further comprises the following additional elements: clock head 1050, mechanical position controller 1052, position shaft encoder 1054, mechanical pusher 1056 and spindle motor controller 1058.

In operation, external clock head 1050 writes a highly accurate clock track around recording medium 1026. Clock head 50 is controlled by the clock/timing controller 1032.

Mechanical position controller 1052 controls the rotational position of mechanical pusher 1056. Mechanical pusher 1056 includes a pin (not shown) that comes in contact with actuator 1060. The rotational center of mechanical pusher 1056 is exactly aligned with the rotational center of actuator pivot 1062. The VCM Driver 48 spindle motor controller 1058 applies a DC current to the VCM 1064 (new number in the figure corresponding to curved parallelogram in bottom right of disk drive) in the disk drive to keep actuator 1060 firmly in contact with the mechanical pusher 1056 pin. Mechanical pusher 1056 thereby controls the radial location of read/write transducer 1022. Position shaft encoder 1054 provides a signal to mechanical position controller 1052 indicative of the position of the mechanical pusher 1056 pin.

Spindle motor controller 1058 rotates recording medium 1060. Transducer 1022 writes the servo pattern on recording medium 1026. The external-servowriting process is optimized by the present invention as described above in the context of self-servowriting embodiments. For example, write width modulation can be minimized in this external-servowriting process by optimizing write frequency and write current; random mechanical vibration can be minimized by optimizing servowriting RPM; and clip level checking can be used to eliminate the introduction of large errors in the product servopattern.

The optimization of the external-servowriting process using the present invention can be performed, for example, in the start sequence 130 of FIG. 3A, or alternatively, at the time of manufacture of the self-servowriting storage device. In this manner, the present invention optimizes the servowriting process for each individual disk drive. This provides improved performance over conventional external-servowriting systems that only optimize the servowriting parameters for each disk drive product and thereby use the same servo writing parameters for all such disk drives. The principle of this invention may be applied to a variety of storage device subsystems having rotatable storage mediums (e.g. optical, magnetic disk drives and tape drives).

VII. Conclusion

In summary, controlling the growth of errors is critical in a typical disk file requiring many thousands of steps to servowrite. Thus it is important to recognize that error growth is attributable to the special properties of servo loops as applied to a repetitive self-propagation process, and that such error growth may be remedied. Remedies include, for example, adjusting the servo loop parameters to produce a desired closed loop response, and digitally filtering the PES recorded during the write revolution to compute corrections to the reference track table values such that the step factor does not exceed unity at any relevant frequency. The effectiveness of these remedies is further enhanced by the proposed improvements of 1) optimizing the write current and write frequency to minimize write width modulation; 2) optimizing the servowriting RPM to minimize random mechanical vibration; and 3) providing a clip level check to eliminate the introduction of large errors in product servopattern. The proposed improvements provide substantial rejection of mechanical disturbances, ensuring a robust servowriting process.

A number of specific embodiments have been described encompassing the present invention. Nevertheless, it will be understood that various modifications may become apparent to those having ordinary skill in the art of self servo propagation without departing from the spirit and the scope of the present invention. Accordingly, it is to be understood that the invention is not to be limited by the specific illustrated embodiments, but only by the scope of the appended claims.

What is claimed is:

1. In a servowriting system for implementation in a storage device including a storage medium and a transducer positionable relative to the storage medium under the control of a servo system for writing position information to the medium, the storage device subsystem having a set of operating parameters, a method for reducing input noise introduced into written position information in a servowriting process, caused by at least one of said operating parameters, comprising the steps of:

writing first servo position information comprising at least one track, each track having a sector including position information, as part of the servowriting process;

measuring an indicium of said input noise introduced into the first written position information; and optimizing, based on said measured indicium of said input noise, at least one operating parameter of the storage device subsystem so as to reduce said input noise and reduce resultant compounded errors in subsequently written position information.

2. The method of claim 1, wherein the servowriting process comprises a self-servowriting process.

3. The method of claim 2, wherein the at least one operating parameter comprises write frequency.

4. The method of claim 2, wherein the storage device comprises a medium capable of rotation and wherein the at least one operating parameter comprises the RPM of the medium.

5. The method of claim 2, wherein the at least one parameter comprises write current.

6. The method of claim 5, wherein the at least one parameter further comprises write frequency and the indicium of said input noise comprises write width modulation error.

7. The method of claim 3, wherein measuring the indicium of error further comprises the steps of:

for each track, sensing the position information of the sector, producing therefrom a readback signal having a measurable amplitude, and determining a difference in magnitude between the readback signal amplitude and a nominal amplitude, thereby obtaining a plurality of differences in magnitude; and determining an average of the plurality of differences in magnitude.

8. The method of claim 2, wherein said method for reducing input noise is performed on individual storage devices as part of an adaptive manufacturing process.

9. In a servowriting system for implementation in a storage device including a storage medium and a transducer positionable relative to the storage medium under the control of a servo system for writing position information to the medium, the storage device subsystem having a set of operating parameters, a method for reducing input noise introduced into written position information in a servowriting process, caused by at least one of said operating parameters, comprising the steps of:

writing first servo position information comprising at least one track, each track having a sector including position information, as part of the servowriting process;

measuring an indicium of said input noise introduced into the first written position information;

using the measured indicium to optimize at least one operating parameter of the servowriting system, whereby introduction of said input noise into subsequently written position information in the servowriting process is reduced;

repeating the writing and measuring steps for a plurality of combinations of write frequency and write current values; and selecting as the at least one optimized parameter the combination for which the predetermined indicium has the lowest value, so as to reduce said input noise in the servowriting process.

10. The method of claim 9, wherein the servowriting process comprises a self-servowriting process.

11. The method of claim 10, wherein the indicium comprises track misregistration.

12. The method of claim 11, wherein measuring the indicium further comprises the steps of:

sensing the first servo position information and producing therefrom a position error signal having a magnitude; and determining a difference between the position error signal magnitude and a nominal magnitude.

13. The method of claim 10, wherein the indicium comprises write width modulation error.

14. In a servowriting system for implementation in a storage device including a storage medium and a transducer positionable relative to the storage medium under the control of a servo system for writing position information to the medium, the storage device subsystem having a set of operating parameters, a method for reducing input noise introduced into written position information in a servowriting process, caused by at least one of said operating parameters, comprising the steps of:

writing first servo position information comprising at least one track, each track having a sector including position information, as part of the servowriting process;

measuring an indicium of said input noise introduced into the first written position information, wherein measuring the indicium further comprises the steps of:

sensing the first servo position information and producing therefrom a position error signal having a magnitude; and determining a difference between the position error signal magnitude and a nominal magnitude; and using the measured indicium to optimize at least one operating parameter of the servowriting system, so as to reduce said input noise in the servowriting process, wherein the servowriting system has a measurable closed loop response, and wherein measuring the indicium further comprises the steps of:

measuring the closed loop response, CL, of the servo system; and dividing the magnitude difference by (1−CL).

15. The method of claim 14, wherein said servowriting system comprises a self-servowriting system.

16. The method of claim 15, wherein the nominal magnitude is obtained by performing a plurality of times the steps of sensing the first servo position information and producing therefrom a position error signal, thereby obtaining a plurality of position error signal magnitudes; and determining an average of the plurality of magnitudes.

17. In a self-servowriting system for implementation in a storage device including a storage medium and a transducer positionable relative to the storage medium under the control of a servo system for writing position information to the medium, the self-servowriting system having a set of operating parameters, a method for reducing sources of error introduced into written position information, comprising the steps of:

writing first servo position information;

measuring an indicium of error introduced into the first written position information;

using the measured indicium to optimize at least one operating parameter of the self-servowriting system, whereby introduction of error into subsequently written position information is reduced;

writing second position information;

servowriting while sensing the second position information and producing therefrom a position error signal having a magnitude;

if the magnitude of the position error signal exceeds a threshold magnitude, temporarily halting servowriting while continuing to sense the second position information until the position error signal produced is determined to be below the threshold magnitude.

18. The method of claim 17, further comprising the step of, upon determining that the magnitude of the position error signal has fallen below the threshold magnitude, resuming servowriting at the same location on the medium where it was halted.

19. The method of claim 17, further comprising the step of terminating servowriting if the magnitude of the position error signal does not fall below the threshold magnitude after a period of time.

20. The method of claim 2, wherein measuring the indicium of error further comprises the steps of:

sensing the first servo position information and producing therefrom a readback signal having an amplitude; and determining a difference between the readback signal amplitude and a nominal amplitude.

21. The method of claim 20, wherein the first servo position information further comprises dual bursts, and wherein the readback signal amplitude is determined by a sum of sensed burst contributions.

22. The method of claim 4, further comprising the step of writing a clock pattern using the storage device transducer, before writing the first servo position information, the clock pattern having a predetermined number of transitions per revolution to provide an integer number of transitions per sector.

23. In a servowriting system for implementation in a storage device including a storage medium and a transducer positionable relative to the storage medium under the control of a servo system for writing position information to the medium, the storage device subsystem having a set of operating parameters, a method for reducing input noise introduced into written position information in a servowriting process, caused by at least one of said operating parameters, comprising the steps of:

writing first servo position information comprising at least one track, each track having a sector including position information, as part of the servowriting process;

measuring an indicium of said input noise introduced into the first written position information;

using the measured indicium to optimize at least one operating parameter of the servowriting system, whereby introduction of said input noise into subsequently written position information is reduced in the servowriting process;

repeating the writing and measuring steps for a plurality of different RPM's; and selecting as the optimized parameter the one of the plurality of RPM's for which the predetermined indicium has the lowest value, so as to reduce said input noise in the servowriting process.

24. The method of claim 23, wherein the servowriting system comprises a self-servowriting system.

25. The method of claim 24, wherein the indicium comprises write width modulation error.

26. The method of claim 1, wherein the servowriting process comprises an external-servowriting process.

27. The method of claim 26, wherein the at least one operating parameter comprises write frequency.

28. The method of claim 26, wherein the storage device comprises a medium capable of rotation and wherein the at least one operating parameter comprises the RPM of the medium, and wherein said method for reducing input noise is performed on individual storage devices as part of an adaptive manufacturing process.

29. The method of claim 26, wherein the at least one parameter comprises write current.

30. The method of claim 29, wherein the at least one parameter further comprises write frequency and the indicium of said input noise comprises write width modulation error.

31. The method of claim 27, wherein measuring the indicium of error further comprises the steps of:

for each track, sensing the position information of the sector, producing therefrom a readback signal having a measurable amplitude, and determining a difference in magnitude between the readback signal amplitude and a nominal amplitude, thereby obtaining a plurality of differences in magnitude; and determining an average of the plurality of differences in magnitude.

32. The method of claim 26, wherein said method for reducing input noise is performed on individual storage devices as part of an adaptive manufacturing process.

33. The method of claim 9, wherein the servowriting process comprises an external-servowriting process.

34. The method of claim 33, wherein the indicium comprises track misregistration.

35. The method of claim 34, wherein measuring the indicium further comprises the steps of:

sensing the first servo position information and producing therefrom a position error signal having a magnitude; and determining a difference between the position error signal magnitude and a nominal magnitude.

36. The method of claim 33, wherein the indicium comprises write width modulation error.

37. The method of claim 14, wherein said servowriting system comprises an external-servowriting system.

38. The method of claim 37, wherein the nominal magnitude is obtained by performing a plurality of times the steps of sensing the first servo position information and producing therefrom a position error signal, thereby obtaining a plurality of position error signal magnitudes; and determining an average of the plurality of magnitudes.

39. In a servowriting system for implementation in a storage device including a storage medium and a transducer positionable relative to the storage medium under the control of a servo system for writing position information to the medium, the servowriting system having a set of operating parameters, a method for reducing sources of error introduced into written position information, comprising the steps of:

writing first servo position information;

measuring an indicium of error introduced into the first written position information;

using the measured indicium to optimize at least one operating parameter of the servowriting system, whereby introduction of error into subsequently written position information is reduced;

writing second position information;

servowriting while sensing the second position information and producing therefrom a position error signal having a magnitude;

if the magnitude of the position error signal exceeds a threshold magnitude, temporarily halting servowriting while continuing to sense the second position information until the position error signal produced is determined to be below the threshold magnitude.

40. The method of claim 39, wherein the servowriting system comprises an external-servowriting system.

41. The method of claim 40, further comprising the step of, upon determining that the magnitude of the position error signal has fallen below the threshold magnitude, resuming servowriting at the same location on the medium where it was halted.

42. The method of claim 40, further comprising the step of terminating servowriting if the magnitude of the position error signal does not fall below the threshold magnitude after a period of time.

43. The method of claim 26, wherein measuring the indicium of error further comprises the steps of:

sensing the first servo position information and producing therefrom a readback signal having an amplitude; and determining a difference between the readback signal amplitude and a nominal amplitude.

44. The method of claim 43, wherein the first servo position information further comprises dual bursts, and wherein the readback signal amplitude is determined by a sum of sensed burst contributions.

45. The method of claim 28, further comprising the step of writing a clock pattern using the storage device transducer, before writing the first servo position information, the clock pattern having a predetermined number of transitions per revolution to provide an integer number of transitions per sector.

46. The method of claim 23, wherein the servowriting system comprises an external-servowriting system.

47. The method of claim 46, wherein the indicium comprises write width modulation error.

* * * * *

UNITED STATES PATENT AND TRADEMARK OFFICE
CERTIFICATE OF CORRECTION

PATENT NO. : 6,476,989 B1
DATED : November 5, 2002
INVENTOR(S) : Chainer et al.

It is certified that error appears in the above-identified patent and that said Letters Patent is hereby corrected as shown below:

Drawings,
Figure 1, Number 42, "SUBTRACTER" should read -- SUBTRACTOR -- .
Figure 10, Number 1056, "Mecanical Pusher" should read -- Mechanical Pusher --.

Column 2,
Line 54, "self propagation" should read -- self-propagation --.
Line 58, "example, include random" should read -- example, random --.

Column 3,
Line 33, "disc" should read -- disk --.
Line 63, "moved-in" should read -- moved in --.

Column 4,
Line 15, "drives" should read -- drive --.

Column 7,
Line 55, "a 3 propagation" should read -- a propagation --.

Column 12,
Line 6, "testing." should read -- testing --.
Line 24, "essentially eliminated" should read -- essentially be eliminated --.
Line 34, "08/08/405,261" should read -- 08/405,261 --.

Column 17,
Line 7, "VCM 1064" should read -- VCM 1064 --.

Signed and Sealed this

Fourth Day of March, 2003

JAMES E. ROGAN
*Director of the United States Patent and Trademark Office*